(12) United States Patent
Gao et al.

(10) Patent No.: US 11,375,413 B2
(45) Date of Patent: Jun. 28, 2022

(54) METHOD AND APPARATUS FOR PROCESSING INFORMATION

(71) Applicant: ZTE Corporation, Guangdong (CN)

(72) Inventors: Yin Gao, Guangdong (CN); Jing Liu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/121,646

(22) Filed: Dec. 14, 2020

(65) Prior Publication Data

US 2021/0195473 A1    Jun. 24, 2021

Related U.S. Application Data

(63) Continuation of application No. 16/116,721, filed on Aug. 29, 2018, now Pat. No. 10,869,352, which is a
(Continued)

(30) Foreign Application Priority Data

Mar. 30, 2016    (CN) .......................... 201610190883.6

(51) Int. Cl.
*H04W 36/00* (2009.01)
*H04W 76/10* (2018.01)
(Continued)

(52) U.S. Cl.
CPC ......... *H04W 36/0055* (2013.01); *H04W 4/80* (2018.02); *H04W 8/08* (2013.01);
(Continued)

(58) Field of Classification Search
CPC ... H04W 36/00; H04W 36/0033; H04W 4/80; H04W 76/10; H04W 76/11; H04W 76/19; H04W 76/20; H04W 8/08
(Continued)

(56) References Cited

U.S. PATENT DOCUMENTS

2010/0272050 A1    10/2010    Lim et al.
2012/0078997 A1    3/2012    Evans et al.
(Continued)

FOREIGN PATENT DOCUMENTS

CN    101562851 A    10/2009
CN    103906152 A    7/2014
(Continued)

OTHER PUBLICATIONS

3GPP TS 36.413 V13.2.0 (Mar. 2016) Technical Specification, "3rd Generation Partnership Project; Technical Specification Group Radio Access Network; Evolved Universal Terrestrial Radio Access Network (E-UTRAN); S1 Application Protocol (S1AP) (Release 13)," 321 pages, Mar. 2016.
(Continued)

*Primary Examiner* — Robert J Lopata
(74) *Attorney, Agent, or Firm* — Perkins Coie LLP

(57) ABSTRACT

The present disclosure discloses a method and apparatus for processing information. The method for processing information comprises: retrieving, by a first base station, user context information of a User Equipment (UE) from a second base station by initiating a procedure to the second base station for retrieving the user context information, wherein the user context information doesn't include user history information; updating, by the first base station, bearer path information and resuming the user context information by initiating a path switch request message to a device in a core network; and performing, by the first base station, one or more of the following operations after the UE resumes to a connected state: re-starting to collect user history information, and re-retrieving user history information from the UE through an air interface.

20 Claims, 15 Drawing Sheets by initiating a procedure to a second base station for retrieving user context information, a first base station retrieves the user context information of a UE from the second base station — Step 101 by initiating a path switch request message to a device in a core network, the first base station updates bearer path information and resumes the user context information — Step 102 the first base station performs one or more of the following operations after the UE resumes to a connected state: re-starting to collect user history information, and re-retrieving user history information from the UE through an air interface — Step 103

Related U.S. Application Data continuation of application No. PCT/CN2017/075017, filed on Feb. 27, 2017.

(51) Int. Cl.
  *H04W 76/20* (2018.01)
  *H04W 76/19* (2018.01)
  *H04W 4/80* (2018.01)
  *H04W 76/11* (2018.01)
  *H04W 8/08* (2009.01)

(52) U.S. Cl.
  CPC ....... *H04W 36/00* (2013.01); *H04W 36/0033* (2013.01); *H04W 76/10* (2018.02); *H04W 76/11* (2018.02); *H04W 76/19* (2018.02); *H04W 76/20* (2018.02)

(58) Field of Classification Search
  USPC ........................................................ 370/329
  See application file for complete search history.

(56) References Cited

U.S. PATENT DOCUMENTS

| | | | | |
|---|---|---|---|---|
| 2013/0150023 A1* | 6/2013 | Kim | ...... | H04W 36/32 |
| | | | | 455/423 |
| 2014/0179325 A1 | 6/2014 | Xu et al. | | |
| 2017/0202051 A1* | 7/2017 | Hwang | ...... | H04W 76/19 |
| 2017/0339612 A1* | 11/2017 | Quan | ...... | H04W 36/04 |
| 2018/0035336 A1* | 2/2018 | Wang | ...... | H04W 8/18 |
| 2018/0110092 A1* | 4/2018 | Liu | ...... | H04W 76/10 |
| 2018/0270787 A1* | 9/2018 | Drevon | ...... | H04W 68/02 |
| 2018/0310206 A1* | 10/2018 | Li | ...... | H04W 48/10 |
| 2018/0343698 A1* | 11/2018 | Mitsui | ...... | H04W 76/19 |
| 2019/0021128 A1* | 1/2019 | Sivavakeesar | ...... | H04W 76/27 |
| 2019/0037629 A1* | 1/2019 | Ryu | ...... | H04W 76/28 |
| 2019/0045570 A1* | 2/2019 | Lu | ...... | H04W 74/0833 |
| 2019/0052435 A1* | 2/2019 | Martin | ...... | H04W 72/0413 |
| 2019/0052607 A1* | 2/2019 | Ohlsson | ...... | H04W 76/28 |

FOREIGN PATENT DOCUMENTS

| | | | |
|---|---|---|---|
| CN | 104521257 A | | 4/2015 |
| EP | 2 882 207 A1 | | 6/2015 |
| KR | 10-2015-0131934 A | | 11/2015 |
| WO | 2014/104705 A1 | | 7/2014 |
| WO | 2015/044682 A1 | | 4/2015 |

OTHER PUBLICATIONS

Chinese Office Action Search Results dated Jun. 4, 2019 for Chinese Application No. 201610190883.6, filed on Mar. 30, 2016 (2 pages).
Communication pursuant to Article 94(3) EPC dated Dec. 9, 2020 for European Application No. 17773001.7, filed on Feb. 27, 2017 (6 pages).
European Extended Search Report dated Mar. 4, 2019 for European Application No. 17773001.7, filed on Feb. 27, 2017 (7 pages).
International Search Report and Written Opinion dated May 19, 2017 for International Application No. PCT/CN2017/075017, filed on Feb. 27, 2017 (12 pages).

* cited by examiner

METHOD AND APPARATUS FOR PROCESSING INFORMATION

CROSS REFERENCE TO RELATED APPLICATIONS

This patent document is a continuation of and claims priority to U.S. patent application Ser. No. 16/116,721, filed on Aug. 29, 2018, which claims the benefit of priority of International Patent Application No. PCT/CN2017/075017, filed on Feb. 27, 2017, which claims the benefit of priority of Chinese Patent Application No. 201610190883.6, filed on Mar. 30, 2016. The entire contents of the before-mentioned patent applications are incorporated by reference as part of the disclosure of this document.

TECHNICAL FIELD OF THE DISCLOSURE

The present disclosure relates to, but is not limited to, wireless communication technologies.

BACKGROUND OF THE DISCLOSURE

With development of communication technologies, in the Internet-of-Things (IoT) era, ten billions of future things all need to access a network. However, the Machine-to-Machine communication does not always have the same type of bandwidth requirement as communication between User Equipments (UEs) after a large amount of devices gain access to the network, only a small amount of data needs to be transmitted, or data transmission frequency is much lower. Unlike communication between UEs, wherein a mobile terminal may be frequently charged, a lot of IoT devices have very low requirements on power consumption to support communication due to the special scenarios under which they are deployed and the huge amount of deployed devices. For example, devices such as water meters, fire extinguishers, sprinkling irrigation switchers in millions of acres of farmable land, weather monitoring stations in harsh environments, etc., only need data transmission at a very low frequency and very low capacity after they gain access to the network. And because charging via external energy requires much time and effort, the 4th Generation mobile communication (simplified as 4G) and the 5th Generation mobile communication (simplified as 5G) cannot satisfy their requirements, rather a network with a low bandwidth, low power consumption and a large-area coverage becomes an optimal option. In this sense, it is the development of things in the IoT to facilitate the rise of a cell network with low bandwidth and low power consumption. In the research of Machine Type Communication (simplified as MTC), regarding terminal devices with low cost and low throughput, a research topic about NarrowBand-Internet of Things (simplified as NB-IoT) has been proposed, i.e., to provide wireless communication services with low throughput to low-cost NB-IoT User Equipment (simplified as UE) at the band of 200 kHz. As respect to NarrowBand-Internet of Things based on Cell networks (simplified as NB-CIoT) users, a dedicated core network may be configured. The operator may manage these terminal devices with special usage in this dedicated core network, and distinguish them from normal users in order to reduce the impact on the normal users as much as possible. In addition, by considering low cost and small data transmission properties of UEs, NB-IoT introduces a different uplink narrowband access capability and an optimized data transmission scheme. The optimized data transmission scheme includes optimized schemes based on transmission in a user plane and in a control plane. Further, for smart phone users, optimized schemes to support the transmission in a user plane and in a control plane may be extended.

In related arts about the optimized transmission scheme in a user plane, similar to the procedure in Long Term Evolution (simplified as LTE), data is transmitted through a Data Radio Bearer (simplified as DRB), while signaling is transmitted through a Signaling Radio Bearer (simplified as SRB) 1/SRB2. Related standards have already specified that for NB-IoT users, only one DRB is configured, while for smart phone users which support a user-plane scheme, multiple bearers may be supported. At the same time, a suspend procedure and a resume procedure are introduced at the network side. The base station and a device in a core network, such as a Mobility Management Entity (simplified as MME), may store user context information when being suspended, and rapidly activate the user context information when being resumed. The suspend procedure and the resume procedure of S1 interface are both imitated by the base station. When a UE needs to transmit data or "signaling+data" in an idle state, the resume mechanism may be directly used, and it does not need to perform procedures, such as encrypting in an air interface and establishing a bearer in the Access Stratum (simplified as AS). The user context information includes the flag information of the user, the flag information related to the S1-interface for the user, the information related to the user security, the information on the bearer for transporting the user traffic, the service quality information of the user, and the information on the user history. The above-described user history information includes history information collected by the base station side when the UE is in a connection state and history information reported by the user side when the UE resides in a connection state and in an idle state recently. The above-described history information reported by the user side includes history cell information when the UE resides in a connection state and/or in an idle state. The history cell information includes but is not limited to cell information of a UMTS Terrestrial Radio Access Network (simplified as UTRAN), a GSM EDGE Radio Access Network (simplified as GERAN), and a LTE system, and it may even include residence information of a Code Division Multiple Access (simplified as CDMA) system and a Wireless Local Area Network (simplified as WLAN). Such information is ranked according to the chronological order. For example, the newest cell is recorded at the most front of the list. The cell information includes one or more information of the following, such as a cell global identifier, a cell type, and residence duration. When a UE moves to a new base station in a suspend state and the new base station initiates a resume procedure, the new base station may retrieve user context information from an old base station which stores the user context information via an X2 interface or a S1 interface.

As for the user history information collected by the base station side when a UE is in a connection state, the history information is transferred from the old base station to the new base station through switching when the UE is in one connection state. According to means provided by related arts, the history information may be used for mobility optimization or paging optimization. And when in a resume procedure, because the UE is in a suspended state, the history information may not be updated. Hence, when the duration of the UE in a suspended state is over long, the information retrieved by the new base station from the old base station may be outdated and inappropriate, so that it may cause negative impact on the following mobility optimization and paging optimization. The history information reported by the UE may record information of history cells when the UE resides in a connection state and/or in an idle state. The history information is reported by the UE to the base station via the air interface, and used for mobility optimization for a heterogeneous network. When considering in the resume procedure, the UE may initiate Tracking Area Update (simplified as TAU) to other base stations and not resume a bearer. Thus, the cell information experienced by the UE in an idle state may need to be updated. If there is only TAU, the user context information retrieving procedure may not happen. If so, UE history information reported by the UE and recorded in the user context information retrieved by the final new base station for resuming the user context information from the old base station may be inappropriate.

In conclusion, in the related arts, retrieving and processing of user context information in a resume procedure may be not reasonable and appropriate, and may cause negative impact on the following mobility optimization and paging optimization, so that transmission optimization in the user plane may not be realized. Hence, under the background of transmission optimization in a user plane, how to realize processing of user context information in a resume procedure becomes a problem which needs to solve in the related arts.

SUMMARY

The following is an overview about the subject matter described in detail herein. The overview is not to limit the protection scope of the claims.

The present disclosure provides a method and apparatus for processing information, which can optimize the processing of user history information in a resume procedure, so that requirements on optimization on user-plane transmission can be satisfied.

A method for processing information comprises:

retrieving, by a first base station, user context information of a User Equipment (UE) from a second base station by initiating a procedure to the second base station for retrieving the user context information, wherein the user context information doesn't include user history information;

updating, by the first base station, bearer path information and resuming the user context information by initiating a path switch request message to a device in a core network; and performing, by the first base station, one or more of the following operations after the UE resumes to a connected state: re-starting to collect user history information, and re-retrieving user history information from the UE through an air interface.

Optionally, the method further comprises:

when the second base station initiates a suspend procedure for a UE, the second base station reports the user history information to the device in the core network through a request message for suspending the user context information, and a path switch response message, which is received by the first base station from the device in the core network in a path switch request message, includes user history information, using, by the first base station, the received user history information for subsequent optimization processing after the UE resumes to a connected state; wherein the received user history information corresponds to a timer; the timer is configured when the device in the core network receives the user history information; before the timer times out, the device in the core network is allowed to carry the user history information when transmitting a response message to the second base station for resuming the user context information or when transmitting a path switch response message to the first base station.

Optionally, the method further comprises:

when the second base station initiates a suspend procedure for a UE, the second base station reports user history information to the device in the core network through a request message for suspending the user context information, and a path switch response message, which is received by the first base station from the device in the core network in a path switch request message, includes user history information and a timestamp, determining, by the first base station, according to the timestamp whether the received user history information is used for subsequent optimization processing after the UE resumes to a connected state; wherein the timestamp corresponds to the user history information, and the timestamp is configured when the device in the core network receives the user history information.

Optionally, the user history information includes one or more of the following: history information of the UE in a connection state, history information recorded by the UE, history information of the UE when being suspended, wherein the history information includes one or more of the following: information of history cells where the UE resides, the information of history cells including one of the following: a cell global identifier, a cell type; duration in one or more states of the following in each history cell: a suspend state, a connection state, and an idle state; duration when the UE resides in each communication mechanism system.

Optionally, the device in the core network includes a Mobility Management Entity (MME), or a Serving Gateway Node which supports NarrowBand-Internet of Things (NB-IoT) users (C-SGN).

A method for processing information comprises:

initiating, by a base station, a procedure for a User Equipment (UE) for suspending user context information, and reporting user history information to a device in a core network through a request message to the device in the core network for suspending user context information;

updating, by the base station, bearer path information and resume the user context information through a request message to the device in the core network for resuming the user context information;

receiving, by the base station, a response message from the device in the core network for resuming the user context information; and when the response message for resuming the user context information doesn't include the user history information, performing, by the base station, one or more of the following operations after the UE resumes to a connected state: re-starting to collect user history information, and re-retrieving user history information from the UE through an air interface.

Optionally, the method further comprises:

when the response message for resuming the user context information includes the user history information, using, by the base station, the received user history information for subsequent optimization processing after the UE resumes to a connected state; wherein the user history information corresponds to a timer; the timer is configured when the device in the core network receives the user history information; before the timer times out, the device in the core network is allowed to carry the user history information when transmitting a response message to the base station for resuming the user context information.

Optionally, the method further comprises:

when the response message for resuming the user context information includes the user history information and the timestamp, determining, by the base station, according to the timestamp whether the received user history information is used for subsequent optimization processing after the UE resumes to a connected state; wherein the timestamp corresponds to the user history information, and the timestamp is configured when the device in the core network receives the user history information.

Optionally, the user history information includes one or more of the following: history information of the UE in a connection state, history information recorded by the UE, history information of the UE when being suspended, wherein the history information includes one or more of the following: information of history cells where the UE resides, the information of history cells including one of the following: a cell global identifier, a cell type; duration in one or more states of the following in each history cell: a suspend state, a connection state, and an idle state; duration when the UE resides in each communication mechanism system.

Optionally, the device in the core network includes a Mobility Management Entity (MME), or a Serving Gateway Node which supports NarrowBand-Internet of Things (NB-IoT) users (C-SGN).

A method for processing information comprises:

retrieving, by a first base station, user context information of a User Equipment (UE) from a second base station by initiating a procedure to the second base station for retrieving the user context information, wherein the user context information includes user history information and a timestamp; the timestamp is configured by the second base station for the locally stored user context information or user history information after a suspend procedure is completed;

updating, by the first base station, bearer path information and resuming the user context information by initiating a path switch request message to a device in a core network; and determining, by the first base station, according to the timestamp whether the user history information is used for subsequent optimization processing after the UE resumes to a connected state.

Optionally, the user history information includes one or more of the following: history information of the UE in a connection state, history information recorded by the UE, history information of the UE when being suspended, wherein the history information includes one or more of the following: information of history cells where the UE resides, the information of history cells including one of the following: a cell global identifier, a cell type; duration in one or more states of the following in each history cell: a suspend state, a connection state, and an idle state; duration when the UE resides in each communication mechanism system.

Optionally, the device in the core network includes a Mobility Management Entity (MME), or a Serving Gateway Node which supports NarrowBand-Internet of Things (NB-IoT) users (C-SGN).

A method for processing information comprises:

receiving, by a device in a core network, a request message including user history information from a first base station for suspending user context information, and configuring a timer for the user history information;

receiving, by the device in the core network, a path switch request message from a second base station, wherein the first base station and the second base station are a same base station or different base stations; and transmitting, by the device in the core network, a path switch response message to the second base station;

wherein if the timer is not timeout, the path switch response message includes the user history information; if the timer times out, the path switch response message doesn't include the user history information.

A method for processing information comprises:

receiving, by a device in a core network, a request message including user history information from a first base station for suspending user context information, and configuring a timestamp for the user history information;

receiving, by the device in the core network, a path switch request message from a second base station, wherein the first base station and the second base station are a same base station or different base stations; and transmitting, by the device in the core network, a path switch response message to the second base station; wherein the path switch response message includes the user history information and the timestamp.

A method for processing information comprises:

receiving, by a device in a core network, a request message including user history information from a first base station for suspending user context information, and configuring a timer for the user history information;

receiving, by the device in the core network, a request message from the base station for resuming the user context information; and transmitting, by the device in the core network, a response message to the base station for resuming the user context information;

wherein if the timer is not timeout, the response message for resuming the user context information includes the user history information; if the timer times out, the response message for resuming the user context information doesn't include the user history information.

A method for processing information comprises:

receiving, by a device in a core network, a request message including user history information from a first base station for suspending user context information, and configuring a timestamp for the user history information;

receiving, by the device in the core network, a request message from the base station for resuming the user context information; and transmitting, by the device in the core network, a response message to the base station for resuming the user context information; wherein the response message for resuming the user context information includes the user history information and the timestamp.

A method for processing information comprises:

receiving, by a second base station, a request message from a first base station for retrieving user context information; and after the second base station locally locates the user context information of a User Equipment (UE) according to the request message for retrieving the user context information, transmitting, by the second base station, the user context information that is located locally to a target base station through a response message for retrieving the user context information, wherein the user context information doesn't include user history information.

Optionally, before receiving the request message from a first base station for retrieving the user context information, the method further comprises:

initiating, by the second base station, a procedure for the UE for suspending the user context information, and reporting the user history information to a device in a core network through a request message to the device in the core network for suspending the user context information.

A method for processing information comprises:

initiating, by a second base station, a procedure for a User Equipment (UE) for suspending user context information, and configuring a timestamp for locally stored user context information or user history information;

receiving, by the second base station, a request message from a first base station for retrieving the user context information; and after the second base station locally locates the user context information of the UE according to the request message for retrieving the user context information, transmitting, by the second base station, the user context information that is located locally to a target base station through a response message for retrieving the user context information, wherein the user context information includes the user history information and the timestamp.

An apparatus for processing information, set in a first base station, comprises:

a first retrieving unit, configured to retrieve user context information of a User Equipment (UE) from a second base station by initiating a procedure to the second base station for retrieving the user context information, wherein the user context information doesn't include user history information;

a path updating unit, configured to update bearer path information and resume the user context information by initiating a path switch request message to a device in a core network; and a second retrieving unit, configured to perform one or more of the following operations after the UE resumes to a connected state: re-starting to collect user history information, and re-retrieving user history information from the UE through an air interface.

Optionally, the apparatus further comprises:

a first processing unit, configured to when the second base station initiates a suspend procedure for a UE, the second base station reports the user history information to the device in the core network through a request message for suspending the user context information, and a path switch response message, which is received by the first base station from the device in the core network in a path switch request message, includes user history information, use the received user history information for subsequent optimization processing after the UE resumes to a connected state; wherein the received user history information corresponds to a timer; the timer is configured when the device in the core network receives the user history information; before the timer times out, the device in the core network is allowed to carry the user history information when transmitting a response message to the second base station for resuming the user context information or when transmitting a path switch response message to the first base station.

Optionally, the apparatus further comprises:

a second processing unit, configured to when the second base station initiates a suspend procedure for a UE, the second base station reports user history information to the device in the core network through a request message for suspending the user context information, and a path switch response message, which is received by the first base station from the device in the core network in a path switch request message, includes user history information and a timestamp, determine according to the timestamp whether the received user history information is used for subsequent optimization processing after the UE resumes to a connected state; wherein the timestamp corresponds to the user history information, and the timestamp is configured when the device in the core network receives the user history information.

An apparatus for processing information, set in a base station, comprises:

a transmitting unit, configured to initiate a procedure for a User Equipment (UE) for suspending user context information, and report user history information to a device in a core network through a request message to the device in the core network for suspending user context information;

a path updating unit, configured to update bearer path information and resume the user context information through a request message to the device in the core network for resuming the user context information;

a receiving unit, configured to receive a response message for resuming the user context information from the device in the core network; and a retrieving unit, configured to when the response message for resuming the user context information doesn't include the user history information, perform one or more of the following operations after the UE resumes to a connected state: re-starting to collect user history information, and re-retrieving user history information from the UE through an air interface.

Optionally, the apparatus further comprises:

a first processing unit, configured to when the response message for resuming the user context information includes the user history information, use the received user history information for subsequent optimization processing after the UE resumes to a connected state; wherein the user history information corresponds to a timer; the timer is configured when the device in the core network receives the user history information; before the timer times out, the device in the core network is allowed to carry the user history information when transmitting a response message to the base station for resuming the user context information.

Optionally, the apparatus further comprises:

a second processing unit, configured to when the response message for resuming the user context information includes the user history information and the timestamp, determine according to the timestamp whether the received user history information is used for subsequent optimization processing after the UE resumes to a connected state; wherein the timestamp corresponds to the user history information, and the timestamp is configured when the device in the core network receives the user history information.

An apparatus for processing information, set in a first base station, comprises:

a retrieving unit, configured to retrieve user context information of a User Equipment (UE) from a second base station by initiating a procedure to the second base station for retrieving the user context information, wherein the user context information includes user history information and a timestamp; the timestamp is configured by the second base station for the locally stored user context information or user history information after a suspend procedure is completed;

a path updating unit, configured to update bearer path information and resume the user context information by initiating a path switch request message to a device in a core network; and a processing unit, configured to determine according to the timestamp whether the user history information is used for subsequent optimization processing after the UE resumes to a connected state.

An apparatus for processing information, set in a device in a core network, comprises:

a receiving unit, configured to receive a request message including user history information from a first base station for suspending user context information, and configure a timer for the user history information;

the receiving unit, further configured to receive a path switch request message from a second base station, wherein the first base station and the second base station are a same base station or different base stations; and a transmitting unit, configured to transmit a path switch response message to the second base station;

wherein if the timer is not timeout, the path switch response message includes the user history information; if the timer times out, the path switch response message doesn't include the user history information.

An apparatus for processing information, set in a device in a core network, comprises:

a receiving unit, configured to receive a request message including user history information from a first base station for suspending user context information, and configure a timestamp for the user history information;

the receiving unit, further configured to receive a path switch request message from a second base station, wherein the first base station and the second base station are a same base station or different base stations; and a transmitting unit, configured to transmit a path switch response message to the second base station; wherein the path switch response message includes the user history information and the timestamp.

An apparatus for processing information, set in a device in a core network, comprises:

a receiving unit, configured to receive a request message including user history information from a first base station for suspending user context information, and configure a timer for the user history information;

the receiving unit, further configured to receive a request message from the base station for resuming the user context information; and a transmitting unit, configured to transmit a response message to the base station for resuming the user context information;

wherein if the timer is not timeout, the response message for resuming the user context information includes the user history information; if the timer times out, the response message for resuming the user context information doesn't include the user history information.

An apparatus for processing information, set in a device in a core network, comprises:

a receiving unit, configured to receive a request message including user history information from a first base station for suspending user context information, and configure a timestamp for the user history information;

the receiving unit, further configured to receive a request message from the base station for resuming the user context information; and a transmitting unit, configured to transmit a response message to the base station for resuming the user context information; wherein the response message for resuming the user context information includes the user history information and the timestamp.

An apparatus for processing information, set in a second base station, comprises:

a receiving unit, configured to receive a request message from a first base station for retrieving user context information; and a transmitting unit, configured to after the second base station locally locates the user context information of a User Equipment (UE) according to the request message for retrieving the user context information, transmit the user context information that is located locally to a target base station through a response message for retrieving the user context information, wherein the user context information doesn't include user history information.

Optionally, the apparatus further comprises:

a reporting unit, configured to initiate a procedure for the UE for suspending the user context information, and report the user history information to a device in a core network through a request message to the device in the core network for suspending the user context information.

An apparatus for processing information, set in a second base station, comprises:

a processing unit, configured to initiate a procedure for a User Equipment (UE) for suspending user context information, and configure a timestamp for locally stored user context information or user history information;

a receiving unit, configured to receive request message from a first base station for retrieving the user context information; and a transmitting unit, configured to after the second base station locally locates the user context information of the UE according to the request message for retrieving the user context information, transmit the user context information that is located locally to a target base station through a response message for retrieving the user context information, wherein the user context information includes the user history information and the timestamp.

A computer storage medium, wherein the computer storage medium stores computer-executable program instructions, the computer-executable program instructions are used for executing any one of above-described methods for processing information.

According to the method and apparatus provided by embodiments of the present disclosure, the way of processing user history information in a resume procedure is optimized. The accuracy of the user history information used for the base station to perform the subsequent optimization processing is enhanced, so that the accuracy of optimization processing is enhanced.

After reading and understanding the accompanying drawings and detailed description, other aspects may be understood.

DETAILED DESCRIPTION OF THE DISCLOSURE

Embodiments of the present disclosure are further described in detail hereinafter with reference to the accompanying drawings. It should be noted that, in case of no conflict, embodiments of the present disclosure and suitable features in embodiments may be combined with each other.

Steps shown in flow charts of the accompanying drawings may be executed by a computer system according to a group of computer-executable instructions. In addition, although logical order is shown in the flow charts, in some cases, a different order from herein may be used to execute the shown or described steps.

It should be noted that, terminologies like "first" and "second" in the specification, claims, and the above-described accompanying drawings of the present disclosure are used for differentiate similar objects, but not used for described specified order or precedence.

Figure 1:
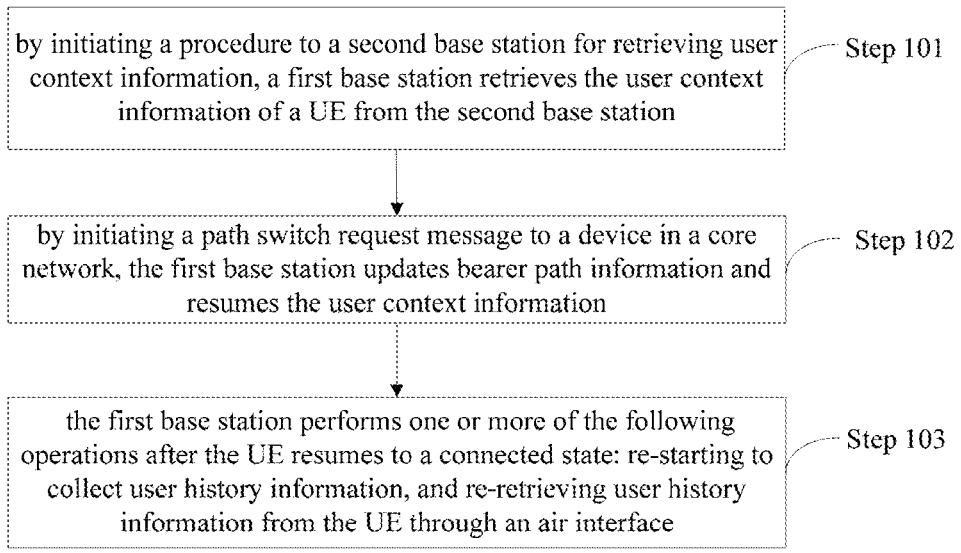
FIG. 1 is a flow chart illustrating a method for processing information according to an embodiment of the present disclosure.

A method for processing information is provided according to an embodiment of the present disclosure, which is performed by a new base station (i.e., a first base station) in a resume procedure across multiple base stations. FIG. 1 is a flow chart illustrating a method for processing information according to an embodiment of the present disclosure. As shown in FIG. 1, a first base station refers to a new base station, and a second base station refers to an old base station. The method provided by the embodiment of the present disclosure includes the following steps, i.e., step 101 to step 103:

Step 101, by initiating a procedure to a second base station for retrieving user context information, a first base station retrieves the user context information of a UE from the second base station. In some embodiments, the user context information doesn't include user history information.

In an embodiment of the present disclosure, when the first base station initiates a procedure for retrieving user context information, it may be a long time passed from the time when the second base station suspends the UE, so that the user history information may become inappropriate since it is already outdated. Hence, the second base station decides not to carry the user history information which is already outdated and inappropriate when transmitting the user context information.

Step 102, by initiating a path switch request message to a device in a core network, the first base station updates bearer path information and resumes the user context information.

Step 103, the first base station performs one or more of the following operations after the UE resumes to a connected state: re-starting to collect user history information, and re-retrieving user history information from the UE through an air interface.

In an embodiment of the present disclosure, because in step 101 when the first base station retrieves the user context information, the second base station doesn't transmit the user history information, the first base station in step 103 may not obtain the user history information. Hence, through step 103, relatively new and complete user history information may be obtained, so that the accuracy of the subsequent optimization processing using the user history information may be enhanced.

Optionally, the method provided by the embodiment of the present disclosure may further include:

Step 104, when the second base station initiates a suspend procedure for a UE, the second base station reports the user history information to the device in the core network through a request message for suspending the user context information, and a path switch response message, which is received by the first base station from the device in the core network in a path switch request message, includes user history information, thus the first base station uses the received user history information for the subsequent optimization processing after the UE resumes to a connected state. In some embodiments, the received user history information corresponds to a timer. The timer is configured when the device in the core network receives the user history information. Before the timer times out, the device in the core network is allowed to carry the user history information when transmitting a response message to the second base station for resuming the user context information or when transmitting a path switch response message to the first base station.

It should be noted that, the above-described timer can be appreciated to use for setting validity of the user history information. Within the timing range of the timer, the user history information is regarded to be valid, and the device in the core network sends the user history information to the first base station, so that the first base station performs the subsequent optimization processing based on the validity of the user history information. After the timer times out, the user history information is regarded to be invalid, and the device in the core network doesn't send the user history information, then the step 103 may be performed.

Optionally, the method provided by the embodiment of the present disclosure may further include:

Step 105, when the second base station initiates a suspend procedure for a UE, the second base station reports user history information to the device in the core network through a request message for suspending the user context information, and a path switch response message, which is received by the first base station from the device in the core network in a path switch request message, includes user history information and a timestamp, thus after the UE resumes to a connected state, the first base station determines according to the timestamp whether the received user history information is used for the subsequent optimization processing. In some embodiments, the timestamp corresponds to the user history information, and the timestamp is configured when the device in the core network receives the user history information.

It should be noted that, the above-described timestamp can be appreciated to use for indicating validity of the user history information. After the user history information is received, the first base station may read the corresponding timestamp to determine whether the user history information becomes inappropriate since it is already outdated. For example, if the difference between current time and the timestamp is beyond a threshold, it may be determined that the user history information is inappropriate since it is already outdated. If it is determined that the user history information is not outdated, the first base station may use the received user history information for the subsequent optimization processing. If it is determined that the user history information is already outdated, the step 103 may be performed.

According to the above-described method provided by an embodiment of the present disclosure, the way of processing user history information in a resume procedure is optimized. The accuracy of the user history information used for the first base station to perform the subsequent optimization processing is enhanced, so that the accuracy of optimization processing is enhanced.

Figure 2:
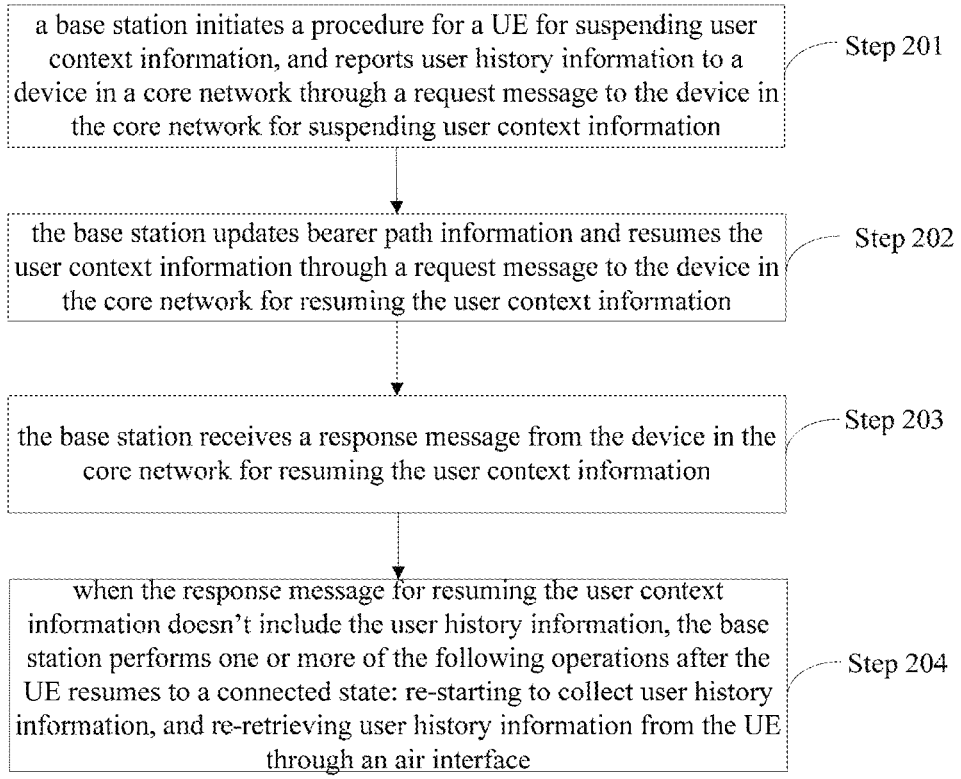
FIG. 2 is a flow chart illustrating another method for processing information according to an embodiment of the present disclosure.

An embodiment of the present disclosure also provides a method for processing information, which is performed by the above-described base station. In the embodiment, it is a same base station to perform a resume procedure after a suspend procedure. FIG. 2 is a flow chart illustrating another method for processing information according to the embodiment of the present disclosure. The method provided by the embodiment of the present disclosure may include the following steps, i.e., step 201 to step 204:

Step 201, a base station initiates a procedure for a UE for suspending user context information, and reports user history information to a device in a core network through a request message to the device in the core network for suspending user context information.

Step 202, the base station updates bearer path information and resumes the user context information through a request message to the device in the core network for resuming the user context information.

Step 203, the base station receives a response message from the device in the core network for resuming the user context information.

Step 204, when the response message for resuming the user context information doesn't include the user history information, the base station performs one or more of the following operations after the UE resumes to a connected state: re-starting to collect user history information, and re-retrieving user history information from the UE through an air interface.

Optionally, the method provided by the embodiment of the present disclosure may further include:

Step 205, when the response message for resuming the user context information includes the user history information, the base station uses the received user history information for the subsequent optimization processing after the UE resumes to a connected state. In some embodiments, the user history information corresponds to a timer. The timer is configured when the device in the core network receives the user history information. Before the timer times out, the device in the core network is allowed to carry the user history information when transmitting a response message to the base station for resuming the user context information.

It should be noted that, based on the description of step 205, about the case in step 204 that the response message for resuming the user context information does not include the user history information, it may include two cases: one is, when the device in the core network transmits the response message for resuming the user context information, it is decided not to carry the user history information in the response message for resuming the user context information; the other is, if a timer is configured in step 204 but the timer times out, the user history information is not carried when the device in the core network transmits the response message for resuming the user context information.

Optionally, the method provided by the embodiment of the present disclosure may further include:

Step 206, when the response message for resuming the user context information includes the user history information and the timestamp, after the UE resumes to a connected state, the base station determines according to the timestamp whether the received user history information is used for the subsequent optimization processing. In some embodiments, the timestamp corresponds to the user history information, and the timestamp is configured when the device in the core network receives the user history information.

It should be noted that, the above-described timestamp can be appreciated to use for indicating validity of the user history information. After the user history information is received, the base station may read the corresponding timestamp to determine whether the user history information becomes inappropriate since it is already outdated. For example, if the difference between current time and the timestamp is beyond a threshold, it may be determined that the user history information is inappropriate since it is already outdated. If it is determined that the user history information is not outdated, the first base station may use the received user history information for the subsequent optimization processing. If it is determined that the user history information is already outdated, the step 204 may be performed.

According to the above-described method provided by an embodiment of the present disclosure, the way of processing user history information in a resume procedure is optimized. The accuracy of the user history information used for the base station to perform the subsequent optimization processing is enhanced, so that the accuracy of optimization processing is enhanced.

Figure 3:
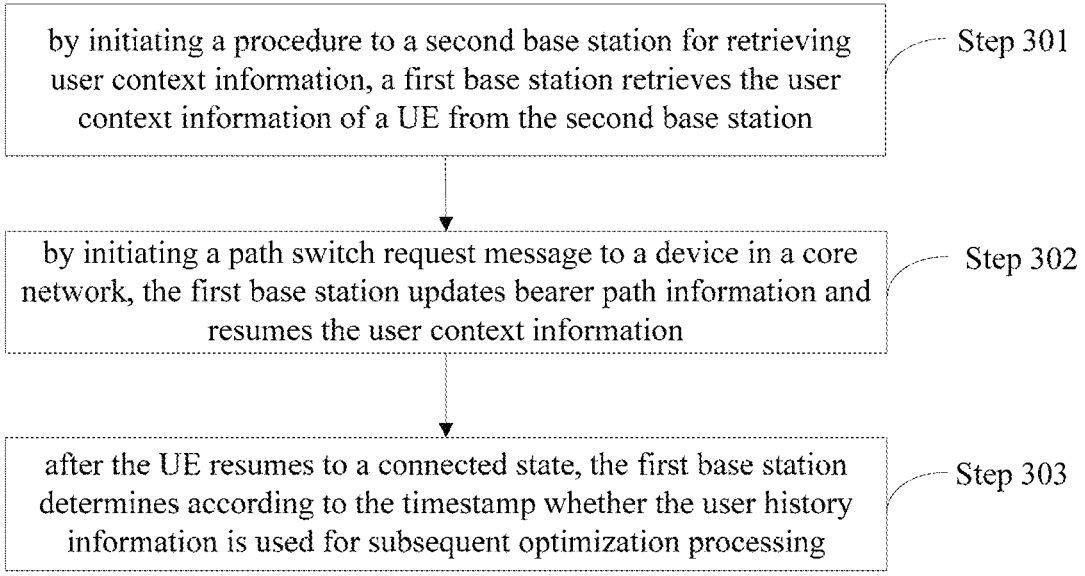
FIG. 3 is a flow chart illustrating another method for processing information according to an embodiment of the present disclosure.

An embodiment of the present disclosure also provides a method for processing information, which is performed by a new base station (i.e., a first base station) in a resume procedure across multiple base stations. FIG. 3 is a flow chart illustrating another method for processing information according to the embodiment of the present disclosure. In the embodiment shown in FIG. 3, a first base station refers to a new base station, and a second base station refers to an old base station. The method provided by the embodiment of the present disclosure includes the following steps, i.e., step 301 to step 303:

Step 301, by initiating a procedure to a second base station for retrieving user context information, a first base station retrieves the user context information of a UE from the second base station. In some embodiments, the user context information includes user history information and a timestamp. The timestamp is configured by the second base station for the locally stored user context information or user history information after a suspend procedure is completed.

Step 302, by initiating a path switch request message to a device in a core network, the first base station updates bearer path information and resumes the user context information.

Step 303, after the UE resumes to a connected state, the first base station determines according to the timestamp whether the user history information is used for subsequent optimization processing.

It should be noted that, the above-described timestamp can be appreciated to use for indicating validity of the user history information. After the user history information is received, the first base station may read the corresponding timestamp to determine whether the user history information becomes inappropriate since it is already outdated. For example, if the difference between current time and the timestamp is beyond a threshold, it may be determined that the user history information is inappropriate since it is already outdated. If it is determined that the user history information is not outdated, the first base station may use the received user history information for the subsequent optimization processing. If it is determined that the user history information is already outdated, the step 204 may be performed.

According to the above-described method provided by an embodiment of the present disclosure, the way of processing user history information in a resume procedure is optimized. The accuracy of the user history information used for the first base station to perform the subsequent optimization processing is enhanced, so that the accuracy of optimization processing is enhanced.

Figure 4:
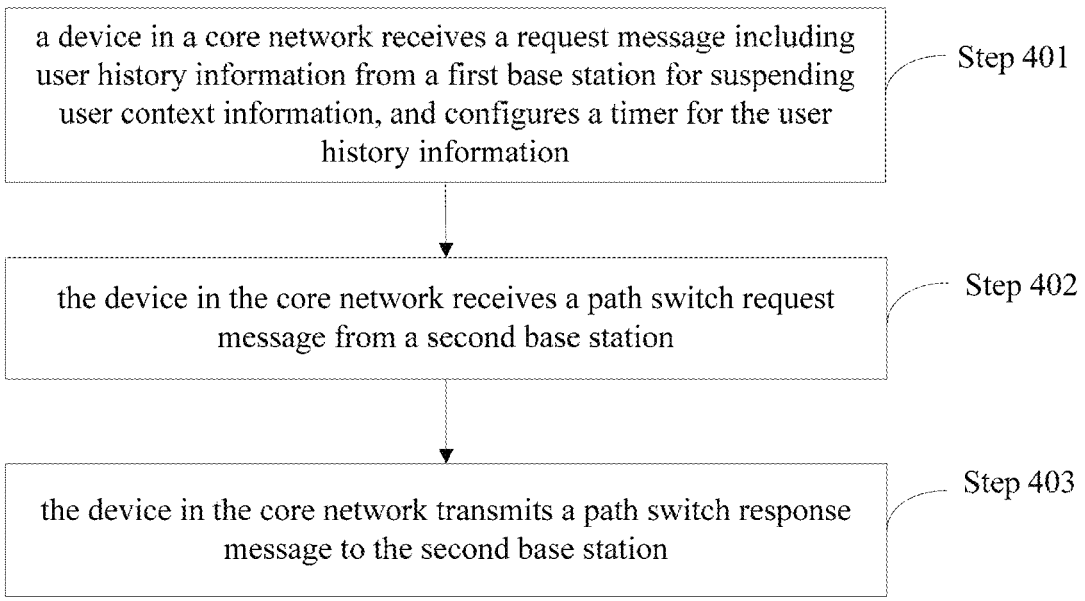
FIG. 4 is a flow chart illustrating another method for processing information according to an embodiment of the present disclosure.

An embodiment of the present disclosure also provides a method for processing information, which is performed by a device in a core network. FIG. 4 is a flow chart illustrating another method for processing information according to the embodiment of the present disclosure. The method provided by the embodiment of the present disclosure includes the following steps, i.e., step 401 to step 403:

Step 401, a device in a core network receives a request message including user history information from a first base station for suspending user context information, and configures a timer for the user history information.

Step 402, the device in the core network receives a path switch request message from a second base station. In some embodiments, the first base station and the second base station are a same base station or different base stations.

Step 403, the device in the core network transmits a path switch response message to the second base station.

In some embodiments, if the timer is not timeout, the path switch response message includes the user history information; if the timer times out, the path switch response message doesn't include the user history information.

Optionally, in some embodiments of the present disclosure, the first base station and the second base station may substantially be a same base station, wherein "the first base station" and "the second base station" can be regarded as being differentiated in time. In some embodiments of the present disclosure, the first base station and the second base station may substantially be two different base stations, for example, the first base station and the second base station as described in the above embodiments.

Optionally, in some embodiments of the present disclosure, the above-described timer may refer to the timer as described in the above embodiments, which are not described in detail herein.

According to the above-described method provided by an embodiment of the present disclosure, the way of processing user history information in a resume procedure is optimized. The accuracy of the user history information used for the base station to perform the subsequent optimization processing is enhanced, so that the accuracy of optimization processing is enhanced.

Figure 5:
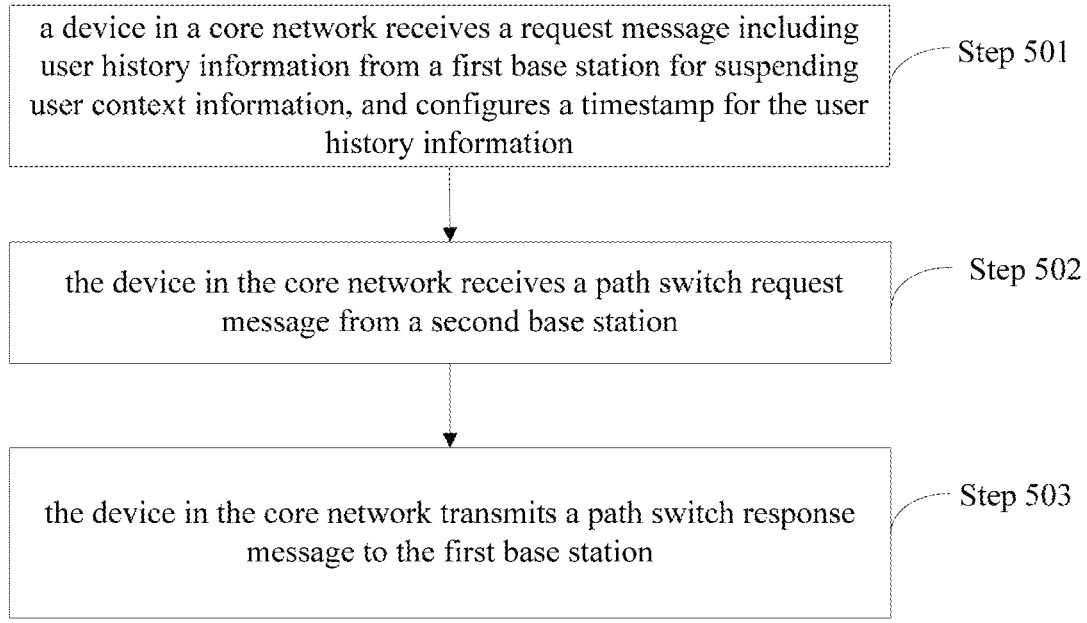
FIG. 5 is a flow chart illustrating another method for processing information according to an embodiment of the present disclosure.

An embodiment of the present disclosure also provides a method for processing information, which is performed by a device in a core network. FIG. 5 is a flow chart illustrating another method for processing information according to the embodiment of the present disclosure. The method provided by the embodiment of the present disclosure includes the following steps, i.e., step 501 to step 503:

Step 501, a device in a core network receives a request message including user history information from a first base station for suspending user context information, and configures a timestamp for the user history information.

Step 502, the device in the core network receives a path switch request message from a second base station. In some embodiments, the first base station and the second base station are a same base station or different base stations.

Step 503, the device in the core network transmits a path switch response message to the first base station. In some embodiments, the path switch response message includes the user history information and the timestamp.

Optionally, in some embodiments of the present disclosure, the first base station and the second base station may substantially be a same base station. In some embodiments, "the first base station" and "the second base station" can be regarded as being differentiated in time. In some embodiments of the present disclosure, the first base station and the second base station may substantially be two different base stations, for example, the first base station and the second base station as described in the above embodiments.

Optionally, in some embodiments of the present disclosure, the above-described timestamp may refer to the timestamp as described in the above embodiments, which are not described in detail herein.

According to the above-described method provided by an embodiment of the present disclosure, the way of processing user history information in a resume procedure is optimized. The accuracy of the user history information used for the base station to perform the subsequent optimization processing is enhanced, so that the accuracy of optimization processing is enhanced.

Figure 6:
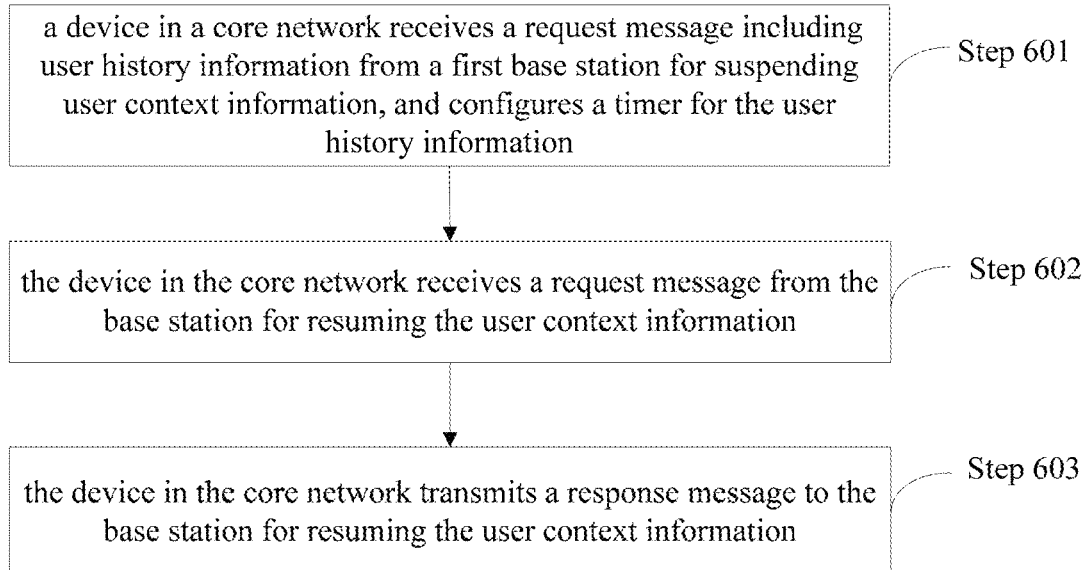
FIG. 6 is a flow chart illustrating another method for processing information according to an embodiment of the present disclosure.

An embodiment of the present disclosure also provides a method for processing information, which is performed by a device in a core network. FIG. 6 is a flow chart illustrating another method for processing information according to the embodiment of the present disclosure. The method provided by the embodiment of the present disclosure includes the following steps, i.e., step 601 to step 603:

Step 601, a device in a core network receives a request message including user history information from a first base station for suspending user context information, and configures a timer for the user history information.

Step 602, the device in the core network receives a request message from the base station for resuming the user context information.

Step 603, the device in the core network transmits a response message to the base station for resuming the user context information.

In some embodiments, if the timer is not timeout, the response message for resuming the user context information includes the user history information; if the timer times out, the response message for resuming the user context information doesn't include the user history information.

Optionally, in some embodiments of the present disclosure, the above-described timer may refer to the timer as described in the above embodiments, which are not described in detail herein.

According to the above-described method provided by an embodiment of the present disclosure, the way of processing user history information in a resume procedure is optimized. The accuracy of the user history information used for the base station to perform the subsequent optimization processing is enhanced, so that the accuracy of optimization processing is enhanced.

Figure 7:
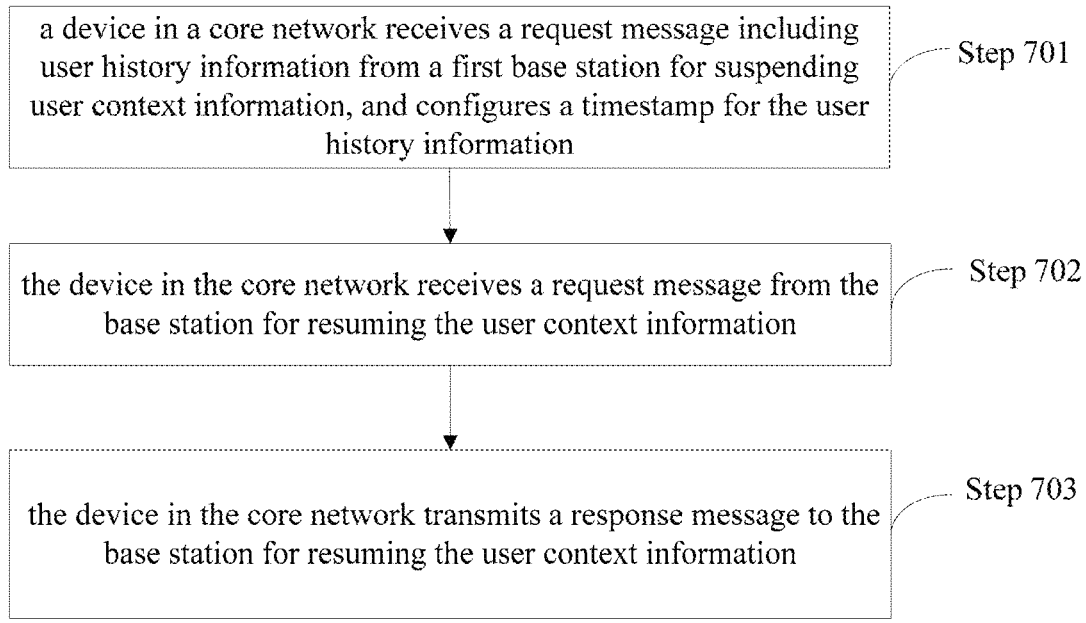
FIG. 7 is a flow chart illustrating another method for processing information according to an embodiment of the present disclosure.

An embodiment of the present disclosure also provides a method for processing information, which is performed by a device in a core network. FIG. 7 is a flow chart illustrating another method for processing information according to the embodiment of the present disclosure. The method provided by the embodiment of the present disclosure includes the following steps, i.e., step 701 to step 703:

Step 701, a device in a core network receives a request message including user history information from a first base station for suspending user context information, and configures a timestamp for the user history information.

Step 702, the device in the core network receives a request message from the base station for resuming the user context information.

Step 703, the device in the core network transmits a response message to the base station for resuming the user context information. In some embodiments, the response message for resuming the user context information includes the user history information and the timestamp.

Optionally, in some embodiments of the present disclosure, the above-described timestamp may refer to the timestamp as described in the above embodiments, which are not described in detail herein.

According to the above-described method provided by an embodiment of the present disclosure, the way of processing user history information in a resume procedure is optimized. The accuracy of the user history information used for the base station to perform the subsequent optimization processing is enhanced, so that the accuracy of optimization processing is enhanced.

Figure 8:
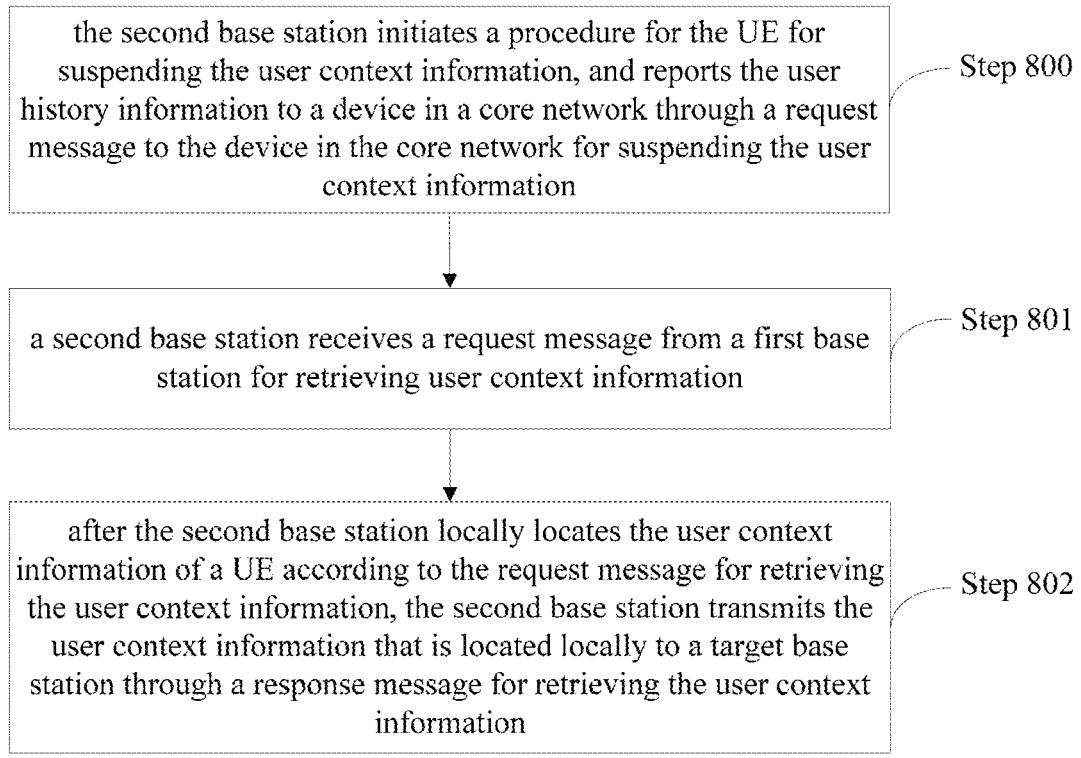
FIG. 8 is a flow chart illustrating another method for processing information according to an embodiment of the present disclosure.

An embodiment of the present disclosure also provides a method for processing information, which is performed by an old base station (i.e., a second base station) in a resume procedure across multiple base stations. FIG. 8 is a flow chart illustrating another method for processing information according to the embodiment of the present disclosure. In the embodiment shown in FIG. 8, a first base station refers to a new base station, and a second base station refers to an old base station. The method provided by the embodiment of the present disclosure includes the following steps, i.e., step 801 to step 802:

Step 801, a second base station receives a request message from a first base station for retrieving user context information.

Step 802, after the second base station locally locates the user context information of a UE according to the request message for retrieving the user context information, the second base station transmits the user context information that is located locally to a target base station through a response message for retrieving the user context information. In some embodiments, the user context information doesn't include user history information.

Optionally, in the embodiment of the present disclosure, before step 801, the method may further include:

Step 800, the second base station initiates a procedure for the UE for suspending the user context information, and reports the user history information to a device in a core network through a request message to the device in the core network for suspending the user context information.

According to the above-described method provided by an embodiment of the present disclosure, the way of processing user history information in a resume procedure is optimized. The accuracy of the user history information used for the base station to perform the subsequent optimization processing is enhanced, so that the accuracy of optimization processing is enhanced.

Figure 9:
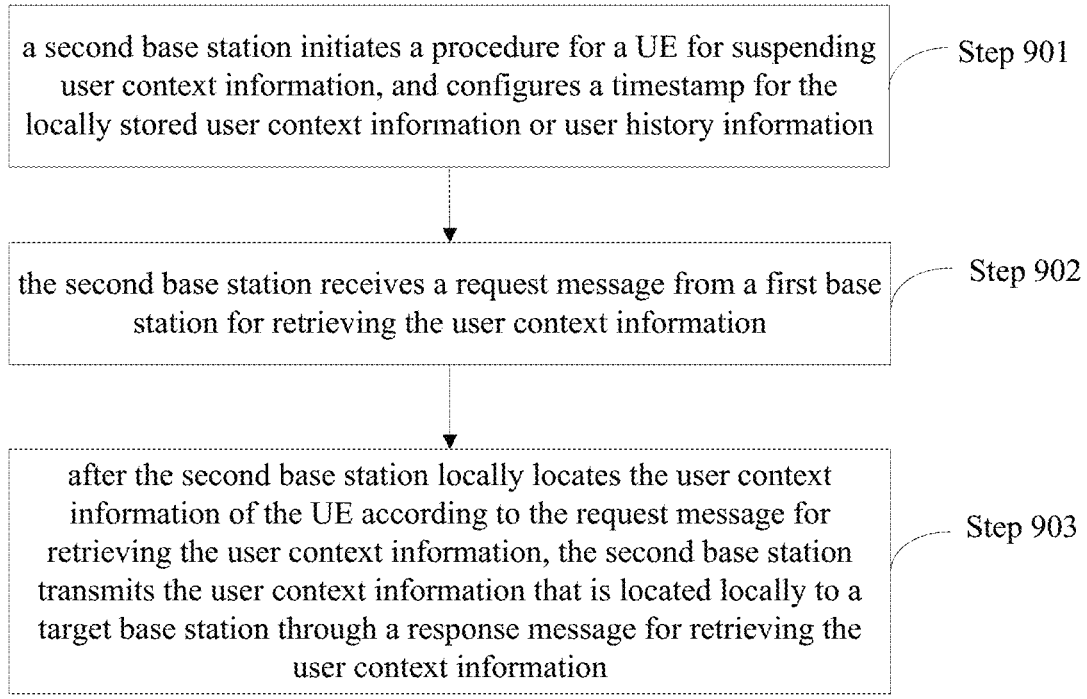
FIG. 9 is a flow chart illustrating another method for processing information according to an embodiment of the present disclosure.

An embodiment of the present disclosure also provides a method for processing information, which is performed by an old base station (i.e., a second base station) in a resume procedure across multiple base stations. FIG. 9 is a flow chart illustrating another method for processing information according to the embodiment of the present disclosure. In the embodiment shown in FIG. 9, a first base station refers to a new base station, and a second base station refers to an old base station. The method provided by the embodiment of the present disclosure includes the following steps, i.e., step 901 to step 903:

Step 901, a second base station initiates a procedure for a UE for suspending user context information, and configures a timestamp for the locally stored user context information or user history information.

Step 902, the second base station receives a request message from a first base station for retrieving the user context information.

Step 903, after the second base station locally locates the user context information of the UE according to the request message for retrieving the user context information, the second base station transmits the user context information that is located locally to a target base station through a response message for retrieving the user context information. In some embodiments, the user context information includes the user history information and the timestamp.

According to the above-described method provided by an embodiment of the present disclosure, the way of processing user history information in a resume procedure is optimized. The accuracy of the user history information used for the base station to perform the subsequent optimization processing is enhanced, so that the accuracy of optimization processing is enhanced.

Optionally, in the above-described embodiments, the device in the core network may include: a MME, or a CIoT Serving Gateway Node (simplified as C-SGN) which supports narrow-band IoT (NB-IoT) users.

Optionally, in the above-described embodiments, the user history information may include one or more of the following: history information of the UE in a connection state, history information recorded by the UE, history information of the UE when being suspended. In some embodiments, the history information includes one or more of the following: information of history cells where the UE resides, wherein the information of history cells including one of the following: a cell global identifier, a cell type; duration in one or more states of the following in each history cell: a suspend state, a connection state, and an idle state; duration when the UE resides in each communication mechanism system. In an example, considering the UE in a suspend procedure also belongs to residing, the following processing may be performed for the residence duration of the UE in a cell in the user history information: duration when the UE resides in a source cell in a suspend state is also counted into the overall residence duration; or, the normal state and the suspend state are differentiated, for example, the residence duration of the UE in a certain cell is differentiated into "suspend-state residence duration" and "connection-state residence duration". And for the user history information recorded by the UE, differentiation processing may also be performed. When the UE records the user history information, for the suspend state, it is recorded separately. What is recorded is the history cell information when the UE resides in a suspend state. The above processing of the user history information may not only be suitable for the resume scenario cross multiple base stations where the UE moves cross base stations, but also be suitable for a resume scenario under a same base station where the UE doesn't move.

In order to make those skilled in the art to more clearly understand the technical schemes provided by the present disclosure, technical schemes provided by the present disclosure are described in detail through some embodiments in the following.

Embodiment 1

Figure 10:
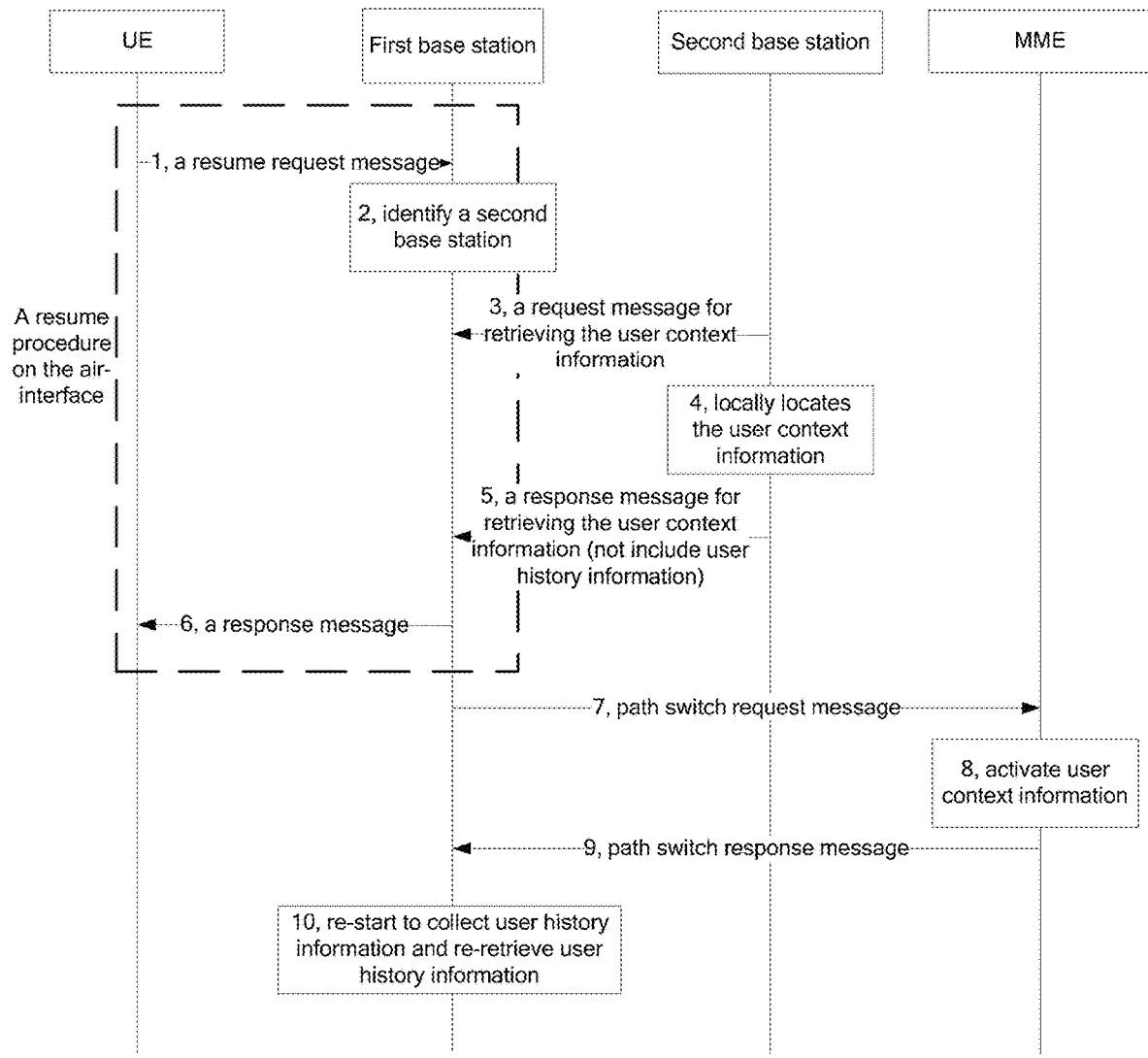
FIG. 10 is a flow chart illustrating a signaling process according to embodiment 1 of the present disclosure.

The embodiment corresponds to a resume scenario across multiple base stations, relating to a UE, a second base station, a first base station and a device in a core network. FIG. 10 is a flow chart illustrating a signaling process corresponding to the embodiment 1. In the embodiment, the signaling process among four devices includes the following steps, i.e., step 1~step 10:

Step 1: a first base station receives a resume request message from a UE through an air interface.

Step 2: the first base station identifies a second base station based on a resume identification (ID) carried in the request message for resuming the user context information.

In some embodiments, the resume ID is an identifier used for uniquely identifying user context information. For example, the identifier may be at least one or a combination of the following: a Cell Radio Network Temporary Identifier (simplified as C-RNTI), a E-UTRAN Cell Global Identifier (simplified as ECGI), a Physical Cell Identity (simplified as PCI), or a unique text flag allocated by the base station, etc.

Step 3: the first base station sends a request message to the second base station for retrieving the user context information.

Step 4: the second base station locally locates the user context information of the UE according to the resume ID carried in the request message for retrieving the user context information.

Step 5: the second base station sends the user context information that is located locally to the first base station through a response message for retrieving the user context information. In some embodiments, the user context information doesn't include user history information.

Step 6: the second base station sends a response message that is in response to the resume request message to the UE after the user context information is successfully retrieved.

It should be noted that, step 3 to step 5 may be called generally as a procedure for retrieving user context information.

Step 7: the first base station sends a path switch request message to a MME to resume the user context information.

Step 8: the MME activates the user context information.

Step 9: the MME sends a path switch response message to the first base station to complete the user context information resumption.

It should be noted that, the MME is used as an example of the device in the core network. Other suitable devices in the core network may also be used to complete the user context resumption. The above-described step 7 to step 9 may be called generally as a path switch request message.

Step 10, the first base station re-starts to collect user history information and re-retrieves user history information from the UE through an air interface after the UE resumes to a connected state.

Embodiment 2

Figure 11:
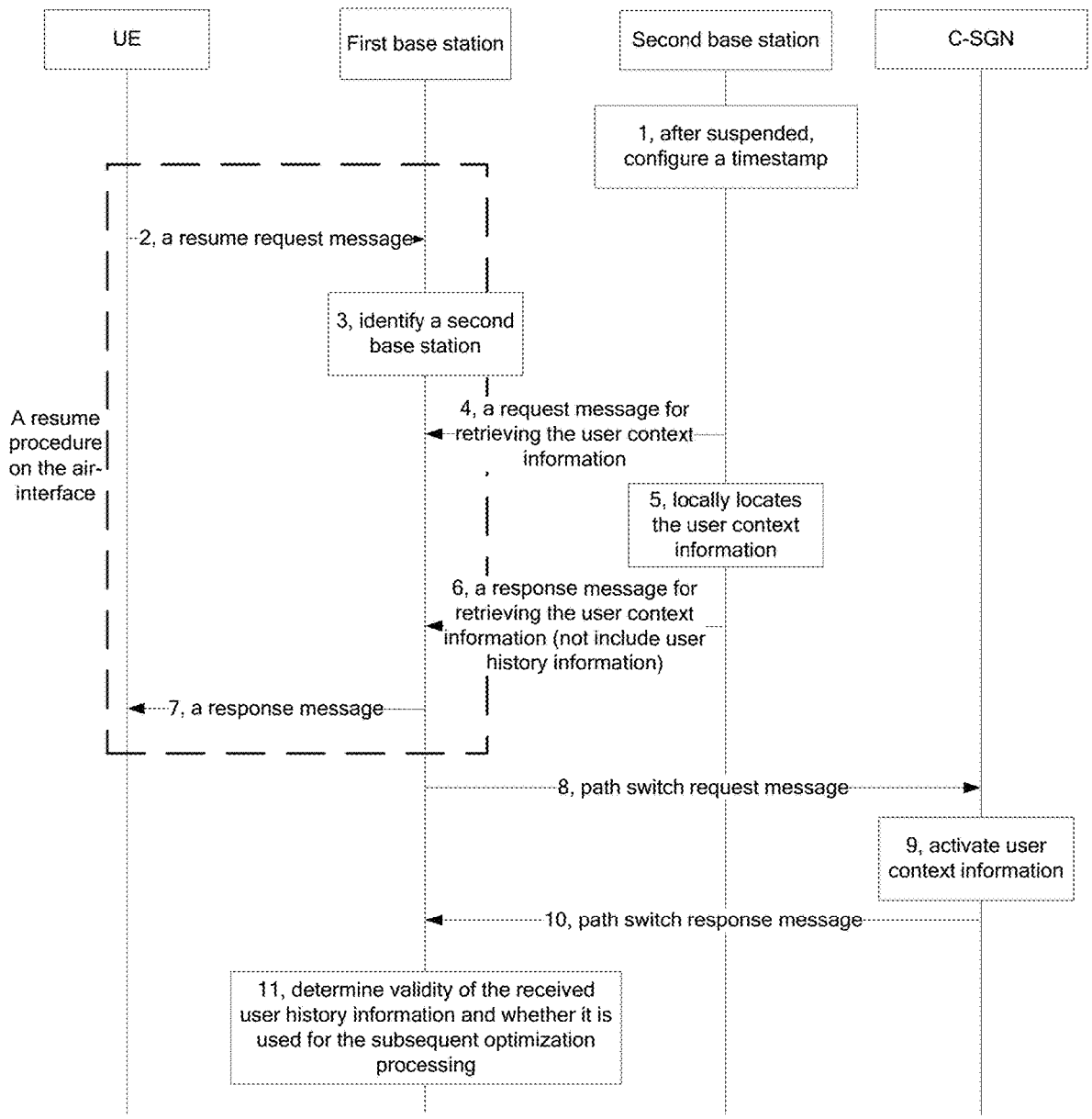
FIG. 11 is a flow chart illustrating a signaling process according to embodiment 2 of the present disclosure.

The embodiment corresponds to a resume scenario across multiple base stations, relating to a UE, a second base station, a first base station and a device in a core network. FIG. 11 is a flow chart illustrating a signaling process corresponding to the embodiment 2. In the embodiment, the signaling process among four devices includes the following steps, i.e., step 1~step 11:

Step 1: a second base station configures a timestamp for the locally stored user context information or user history information after a suspend procedure is completed.

Step 2: a first base station receives a resume request message from a UE through an air interface.

Step 3: the first base station identifies a second base station based on a resume ID carried in the request message for resuming the user context information.

Step 4: the first base station sends a request message to the second base station for retrieving the user context information.

Step 5: the second base station locally locates the user context information of the UE according to the resume ID carried in the request message for retrieving the user context information.

Step 6: the second base station sends the user context information that is located locally to the first base station through a response message for retrieving the user context information. In some embodiments, the user context information includes user history information and a timestamp.

Step 7: the second base station sends a response message that is in response to the resume request message to the UE after the user context information is successfully retrieved.

It should be noted that, step 4 to step 6 may be called generally as a procedure for retrieving user context information.

Step 8: the first base station sends a path switch request message to a C-SGN to resume the user context information.

Step 9: the C-SGN activates the user context information.

Step 10, the C-SGN sends a path switch response message to the first base station to complete the user context resumption.

It should be noted that, the C-SGN is used as an example of the device in the core network. Other suitable devices in the core network may also be used to complete the user context resumption. The above-described step 7 to step 9 may be called generally as a path switch request message.

Step 11, after the UE resumes to a connected state, the first base station determines, according to the timestamp, validity of the received user history information and whether the user history information is used for the subsequent optimization processing, such as mobility optimization, paging optimization.

Embodiment 3

Figure 12:
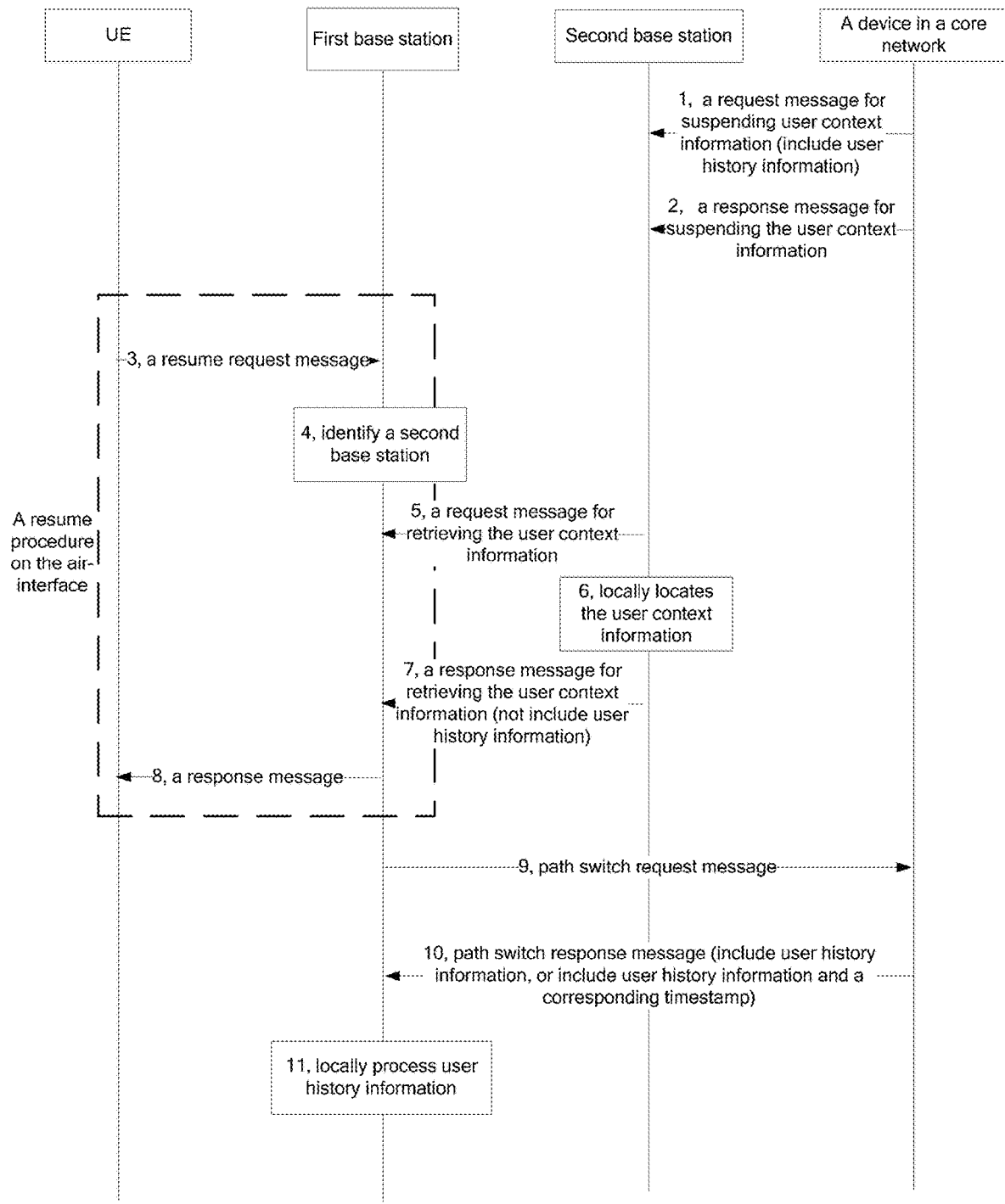
FIG. 12 is a flow chart illustrating a signaling process according to embodiment 3 of the present disclosure.

The embodiment corresponds to a resume scenario across multiple base stations, relating to a UE, a second base station, a first base station and a device in a core network. FIG. 12 is a flow chart illustrating a signaling process corresponding to the embodiment 3. In the embodiment, the signaling process among four devices includes the following steps, i.e., step 1~step 11:

Step 1: a second base station initiates a suspend procedure for a UE, and reports user history information to a device in a core network through a request message for suspending user context information.

Step 2: the device in the core network transmits a response message to the second base station for suspending the user context information.

Step 3: a first base station receives a resume request message from a UE through an air interface.

Step 4: the first base station identifies a second base station based on a resume ID carried in the request message for resuming the user context information.

Step 5: the first base station sends a request message to the second base station for retrieving the user context information.

Step 6: the second base station locally locates the user context information of the UE according to the resume ID carried in the request message for retrieving the user context information.

Step 7: the second base station sends the user context information that is located locally to the first base station through a response message for retrieving the user context information. In some embodiments, the user context information doesn't include the user history information.

Step 8: the second base station sends a response message that is in response to the resume request message to the UE after the user context information is successfully retrieved.

Step 9: the first base station sends a path switch request message to the device in the core network to complete the user context information resumption.

Step 10: the device in the core network sends a path switch response message to the first base station. In some embodiments, the path switch response message may include the user history information, or the path switch response message may include the user history information and the timestamp.

Optionally, in the embodiment, the device in the core network may configure a timer for the user history information, and send the user history information only when the device in the core network transmits the path switch response message within the timing range of the timer, otherwise the device in the core network doesn't send the user history information. Or, the device in the core network may configure a timer when the user history information is received, and send the user history information and its corresponding timestamp together when transmitting the path switch response message.

Step 11, if the user history information isn't received, the first base station re-starts to collect user history information and re-retrieves user history information from the UE through an air interface after the UE resumes to a connected state, and then performs the subsequent optimization processing; if the user history information is received, the first base station uses the user history information for the subsequent optimization processing after the UE resumes to a connected state; if the user history information and the timestamp are received, the first base station determines, according to the timestamp, validity of the user history information and whether the user history information is used for the subsequent optimization processing.

Embodiment 4

Figure 13:
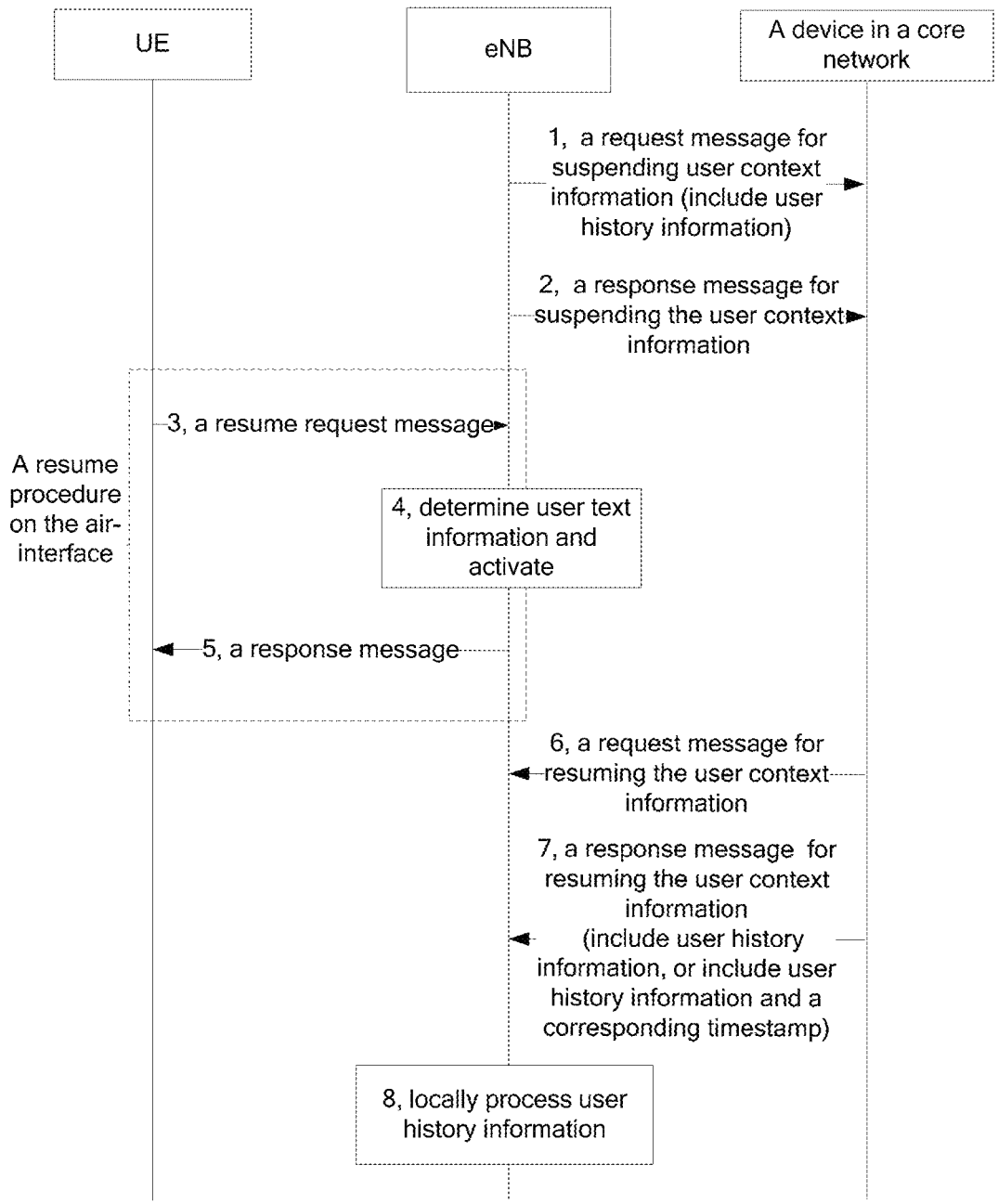
FIG. 13 is a flow chart illustrating a signaling process according to embodiment 4 of the present disclosure.

The embodiment corresponds to a scenario where a same base station suspends user context information and then resumes the user context information, relating to a UE, a base station, and a device in a core network. FIG. 13 is a flow chart illustrating a signaling process corresponding to the embodiment 4. In the embodiment, the signaling process among three devices includes the following steps, i.e., step 1~step 8:

Step 1: a base station initiates a suspend procedure for a UE, and reports user history information to a device in a core network through a request message for suspending user context information.

Step 2: the device in the core network transmits a response message to the second base station for suspending the user context information.

Step 3: the base station receives a resume request message from a UE through an air interface.

Step 4: the base station determines the user context information according to a resume ID carried in the request message for resuming the user context information and activates the user context information.

Step 5: the base station sends a response message that is in response to the resume request message to the UE.

Step 6: the base station sends a request message to the device in the core network for resuming the user context information, to complete the user context information resumption.

Step 7: the device in the core network sends a response message to the base station for resuming the user context information. In some embodiments, the response message for resuming the user context information may include the user history information, or the response message for resuming the user context information may include the user history information and the timestamp.

Optionally, in the embodiment, the device in the core network may configure a timer for the user history information, and send the user history information only when the device in the core network transmits the response message for resuming the user context information within the timing range of the timer, otherwise the device in the core network doesn't send the user history information. Or, the device in the core network may configure a timer when the user history information is received, and send the user history information and the corresponding timestamp together when transmitting the response message for resuming the user context information.

Step 8, if the user history information isn't received, the base station re-starts to collect user history information and re-retrieves user history information from the UE through an air interface after the UE resumes to a connected state, and then performs the subsequent optimization processing; if the user history information is received, the base station uses the user history information for the subsequent optimization processing after the UE resumes to a connected state; if the user history information and the timestamp are received, the base station determines, according to the timestamp, validity of the user history information and whether the user history information is used for the subsequent optimization processing.

Figure 14:
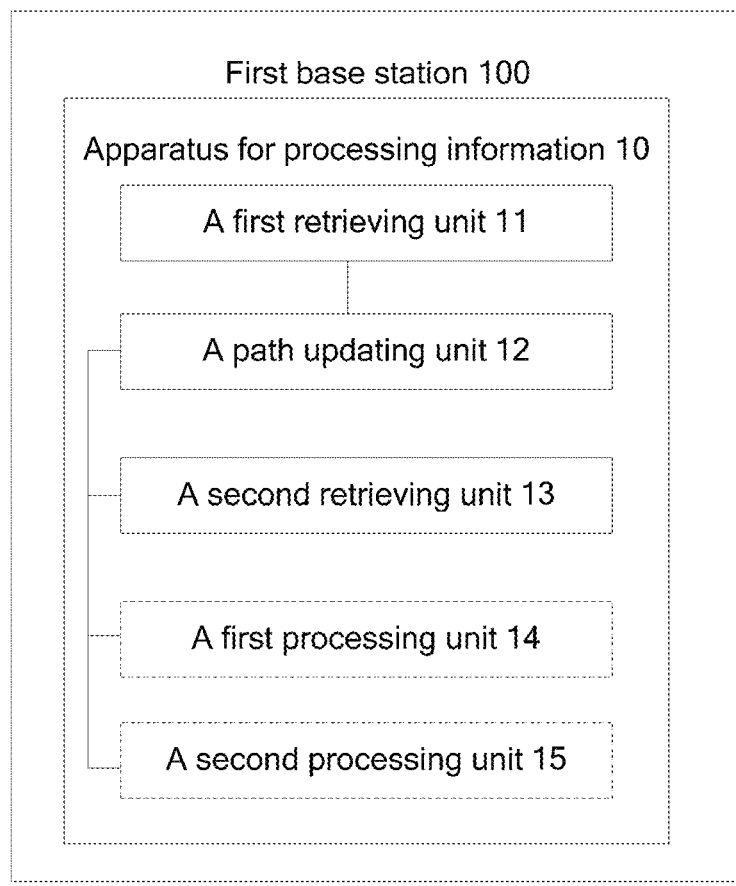
FIG. 14 is a schematic diagram illustrating a structure of an apparatus for processing information according to an embodiment of the present disclosure.

An embodiment of the present disclosure provides an apparatus 10 for processing information. The apparatus for processing information is set in a first base station 100. FIG. 14 is a schematic diagram illustrating a structure of an apparatus for processing information according to an embodiment of the present disclosure. The apparatus for processing information according to the embodiment of the present disclosure may include: a first retrieving unit 11, a path updating unit 12, and a second retrieving unit 13.

The first retrieving unit 11 is configured to retrieve user context information of a User Equipment (UE) from a second base station by initiating a procedure to the second base station for retrieving the user context information. In some embodiments, the user context information doesn't include user history information.

The path updating unit 12 is configured to update bearer path information and resume the user context information by initiating a path switch request message to a device in a core network.

The second retrieving unit 13 is configured to perform one or more of the following operations after the UE resumes to a connected state: re-starting to collect user history information, and re-retrieving user history information from the UE through an air interface.

Optionally in the embodiment of the present disclosure, as shown in FIG. 14, the apparatus may further include:

a first processing unit 14, configured to when the second base station initiates a suspend procedure for a UE, the second base station reports the user history information to the device in the core network through a request message for suspending the user context information, and a path switch response message, which is received by the first base station from the device in the core network in a path switch request message, includes user history information, use the received user history information for subsequent optimization processing after the UE resumes to a connected state. In some embodiments, the received user history information corresponds to a timer; the timer is configured when the device in the core network receives the user history information; before the timer times out, the device in the core network is allowed to carry the user history information when transmitting a response message to the second base station for resuming the user context information or when transmitting a path switch response message to the first base station.

Optionally in the embodiment of the present disclosure, as shown in FIG. 14, the apparatus may further include:

a second processing unit 15, configured to when the second base station initiates a suspend procedure for a UE, the second base station reports user history information to the device in the core network through a request message for suspending the user context information, and a path switch response message, which is received by the first base station from the device in the core network in a path switch request message, includes user history information and a timestamp, determine according to the timestamp whether the received user history information is used for subsequent optimization processing after the UE resumes to a connected state. In some embodiments, the timestamp corresponds to the user history information, and the timestamp is configured when the device in the core network receives the user history information.

The embodiment of the present disclosure is used to implement the corresponding method embodiment. The procedure and principle of each unit in the embodiment of the present disclosure may refer to the description in the corresponding method embodiment, which is not described in detail herein.

Figure 15:
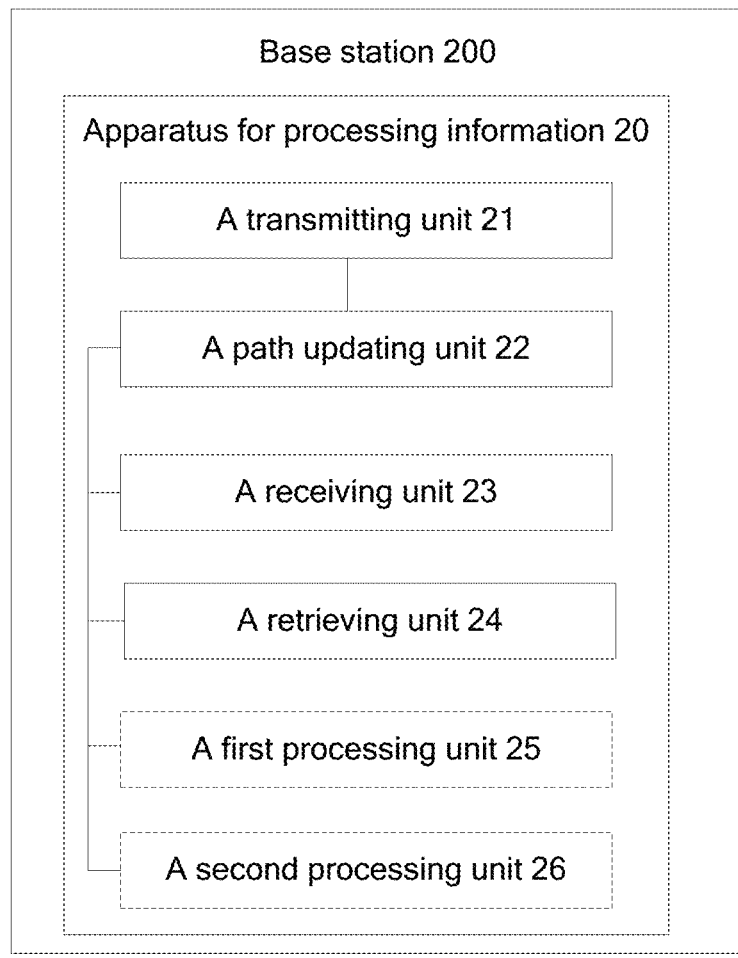
FIG. 15 is a schematic diagram illustrating a structure of an apparatus for processing information according to another embodiment of the present disclosure.

An embodiment of the present disclosure also provides an apparatus 20 for processing information, which is set in a base station 200. FIG. 15 is a schematic diagram illustrating a structure of another apparatus for processing information according to an embodiment of the present disclosure. The apparatus may include a transmitting unit 21, a path updating unit 22, a receiving unit 23 and a retrieving unit 24.

The transmitting unit 21 is configured to initiate a procedure for a User Equipment (UE) for suspending user context information, and report user history information to a device in a core network through a request message to the device in the core network for suspending user context information.

The path updating unit 22 is configured to update bearer path information and resume the user context information through a request message to the device in the core network for resuming the user context information.

The receiving unit 23 is configured to receive a response message for resuming the user context information from the device in the core network.

The retrieving unit 24 is configured to when the response message for resuming the user context information doesn't include the user history information, perform one or more of the following operations after the UE resumes to a connected state: re-starting to collect user history information, and re-retrieving user history information from the UE through an air interface.

Optionally in the embodiment of the present disclosure, as shown in FIG. 15, the apparatus may further include:

a first processing unit 25, configured to when the response message for resuming the user context information includes the user history information, use the received user history information for subsequent optimization processing after the UE resumes to a connected state. In some embodiments, the user history information corresponds to a timer; the timer is configured when the device in the core network receives the user history information; before the timer times out, the device in the core network is allowed to carry the user history information when transmitting a response message to the base station for resuming the user context information.

Optionally in the embodiment of the present disclosure, as shown in FIG. 15, the apparatus may further include:

a second processing unit 26, configured to when the response message for resuming the user context information includes the user history information and the timestamp, determine according to the timestamp whether the received user history information is used for subsequent optimization processing after the UE resumes to a connected state. In some embodiments, the timestamp corresponds to the user history information, and the timestamp is configured when the device in the core network receives the user history information.

The embodiment of the present disclosure is used to implement the corresponding method embodiment. The procedure and principle of each unit in the embodiment of the present disclosure may refer to the description in the corresponding method embodiment, which is not described in detail herein.

Figure 16:
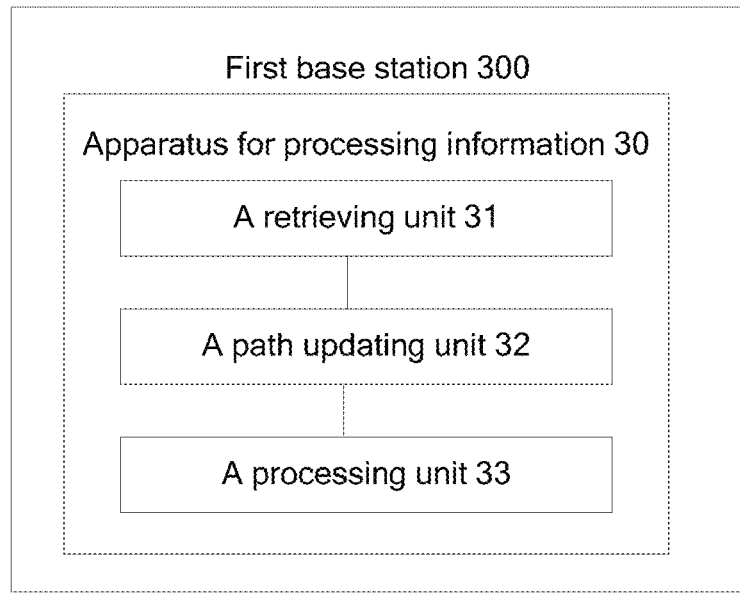
FIG. 16 is a schematic diagram illustrating a structure of an apparatus for processing information according to another embodiment of the present disclosure.

An embodiment of the present disclosure provides an apparatus 30 for processing information. The apparatus for processing information is set in a first base station 300. FIG. 16 is a schematic diagram illustrating a structure of another apparatus for processing information according to an embodiment of the present disclosure. The apparatus may include: a retrieving unit 31, a path updating unit 32, and a processing unit 33.

The retrieving unit 31 is configured to retrieve user context information of a User Equipment (UE) from a second base station by initiating a procedure to the second base station for retrieving the user context information. In some embodiments, the user context information includes user history information and a timestamp; the timestamp is configured by the second base station for the locally stored user context information or user history information after a suspend procedure is completed.

The path updating unit 32 is configured to update bearer path information and resume the user context information by initiating a path switch request message to a device in a core network.

The processing unit 33 is configured to determine according to the timestamp whether the user history information is used for the subsequent optimization processing after the UE resumes to a connected state.

The embodiment of the present disclosure is used to implement the corresponding method embodiment. The procedure and principle of each unit in the embodiment of the present disclosure may refer to the description in the corresponding method embodiment, which is not described in detail herein.

Figure 17:
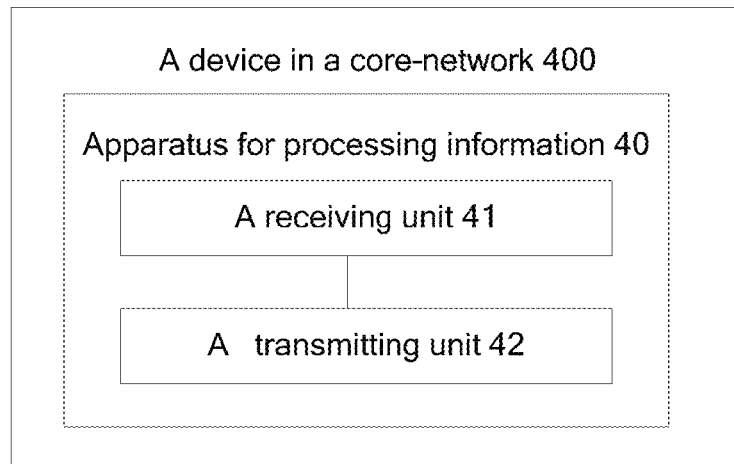
FIG. 17 is a schematic diagram illustrating a structure of an apparatus for processing information according to another embodiment of the present disclosure.

An embodiment of the present disclosure also provides an apparatus 40 for processing information, which is set in a device in a core network 400. FIG. 17 is a schematic diagram illustrating a structure of another apparatus for processing information according to an embodiment of the present disclosure. The apparatus may include a receiving unit 41 and a transmitting unit 42.

The receiving unit 41 is configured to receive a request message including user history information from a first base station for suspending user context information, and configure a timer for the user history information.

The receiving unit 41 is further configured to receive a path switch request message from a second base station. In some embodiments, the first base station and the second base station are a same base station or different base stations.

The transmitting unit 42 is configured to transmit a path switch response message to the second base station. In some embodiments, if the timer is not timeout, the path switch response message includes the user history information; if the timer times out, the path switch response message doesn't include the user history information.

The embodiment of the present disclosure is used to implement the corresponding method embodiment. The procedure and principle of each unit in the embodiment of the present disclosure may refer to the description in the corresponding method embodiment, which is not described in detail herein.

Figure 18:
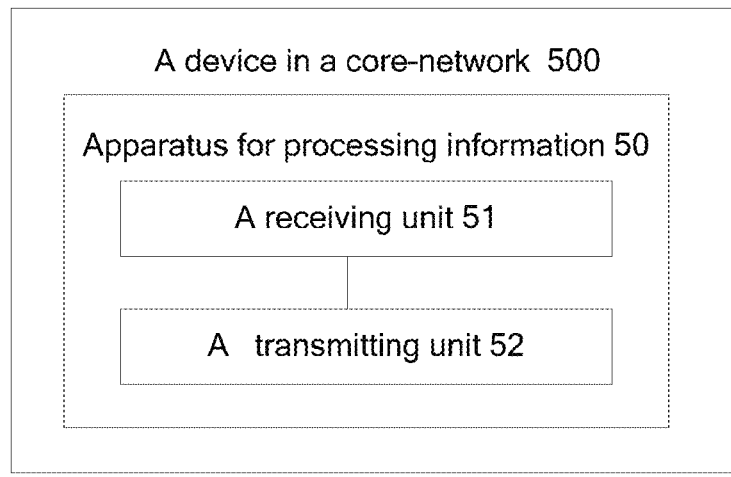
FIG. 18 is a schematic diagram illustrating a structure of an apparatus for processing information according to another embodiment of the present disclosure.

An embodiment of the present disclosure also provides an apparatus 50 for processing information, which is set in a device in a core network 500. FIG. 18 is a schematic diagram illustrating a structure of another apparatus for processing information according to an embodiment of the present disclosure. The apparatus may include a receiving unit 51 and a transmitting unit 52.

The receiving unit 51 is configured to receive a request message including user history information from a first base station for suspending user context information, and configure a timestamp for the user history information.

The receiving unit 51 is further configured to receive a path switch request message from a second base station. In some embodiments, the first base station and the second base station are a same base station or different base stations.

The transmitting unit 52 is configured to transmit a path switch response message to the second base station. In some embodiments, the path switch response message includes the user history information and the timestamp.

The embodiment of the present disclosure is used to implement the corresponding method embodiment. The procedure and principle of each unit in the embodiment of the present disclosure may refer to the description in the corresponding method embodiment, which is not described in detail herein.

Figure 19:
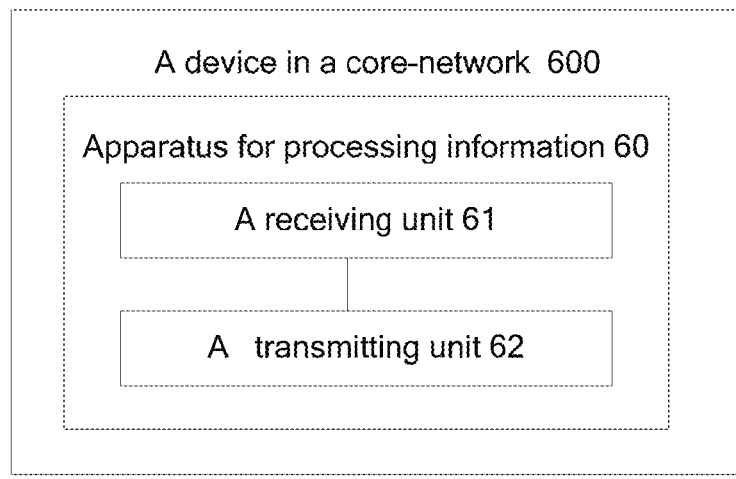
FIG. 19 is a schematic diagram illustrating a structure of an apparatus for processing information according to another embodiment of the present disclosure.

An embodiment of the present disclosure also provides an apparatus 60 for processing information, which is set in a device in a core network 600. FIG. 19 is a schematic diagram illustrating a structure of another apparatus for processing information according to an embodiment of the present disclosure. The apparatus may include a receiving unit 61 and a transmitting unit 62.

The receiving unit 61 is configured to receive a request message including user history information from a first base station for suspending user context information, and configure a timer for the user history information.

The receiving unit 61 is further configured to receive a request message from the base station for resuming the user context information.

The transmitting unit 62 is configured to transmit a response message to the base station for resuming the user context information. In some embodiments, if the timer is not timeout, the response message for resuming the user context information includes the user history information; if the timer times out, the response message for resuming the user context information doesn't include the user history information.

The embodiment of the present disclosure is used to implement the corresponding method embodiment. The procedure and principle of each unit in the embodiment of the present disclosure may refer to the description in the corresponding method embodiment, which is not described in detail herein.

Figure 20:
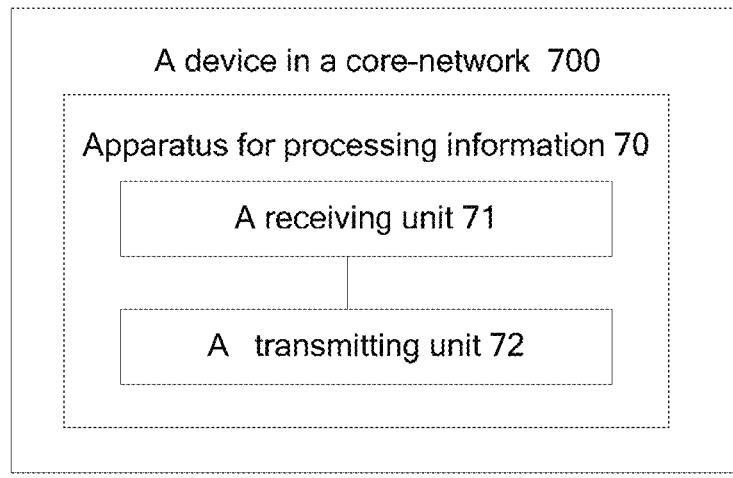
FIG. 20 is a schematic diagram illustrating a structure of an apparatus for processing information according to another embodiment of the present disclosure.

An embodiment of the present disclosure also provides an apparatus 70 for processing information, which is set in a device in a core network 700. FIG. 20 is a schematic diagram illustrating a structure of another apparatus for processing information according to an embodiment of the present disclosure. The apparatus may include a receiving unit 71 and a transmitting unit 72.

The receiving unit 71 is configured to receive a request message including user history information from a first base station for suspending user context information, and configure a timestamp for the user history information.

The receiving unit 71 is further configured to receive a request message from the base station for resuming the user context information.

The transmitting unit 72 is configured to transmit a response message to the base station for resuming the user context information. In some embodiments, the response message for resuming the user context information includes the user history information and the timestamp.

The embodiment of the present disclosure is used to implement the corresponding method embodiment. The procedure and principle of each unit in the embodiment of the present disclosure may refer to the description in the corresponding method embodiment, which is not described in detail herein.

Figure 21:
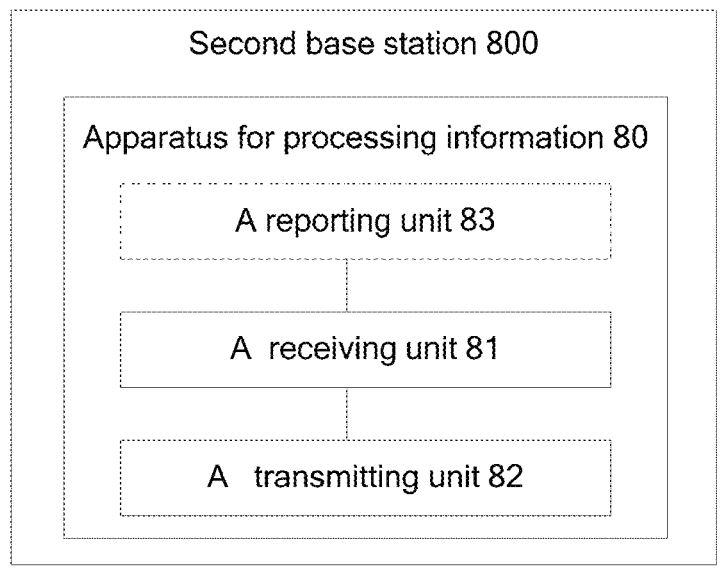
FIG. 21 is a schematic diagram illustrating a structure of an apparatus for processing information according to another embodiment of the present disclosure.

An embodiment of the present disclosure also provides an apparatus 80 for processing information, which is set in a second base station 800. FIG. 21 is a schematic diagram illustrating a structure of another apparatus for processing information according to an embodiment of the present disclosure. In the embodiment shown in FIG. 21, the first base station is a new base station, and a second base station is an old base station. The apparatus may include a receiving unit 81 and a transmitting unit 82.

The receiving unit 81 is configured to receive a request message from a first base station for retrieving user context information.

The transmitting unit 82 is configured to after the second base station locally locates the user context information of a User Equipment (UE) according to the request message for retrieving the user context information, transmit the user context information that is located locally to a target base station through a response message for retrieving the user context information. In some embodiments, the user context information doesn't include user history information.

Optionally in the embodiment of the present disclosure, as shown in FIG. 21, the apparatus may further include:

a reporting unit 83, configured to initiate a procedure for the UE for suspending the user context information, and report the user history information to a device in a core network through a request message to the device in the core network for suspending the user context information.

The embodiment of the present disclosure is used to implement the corresponding method embodiment. The procedure and principle of each unit in the embodiment of the present disclosure may refer to the description in the corresponding method embodiment, which is not described in detail herein.

Figure 22:
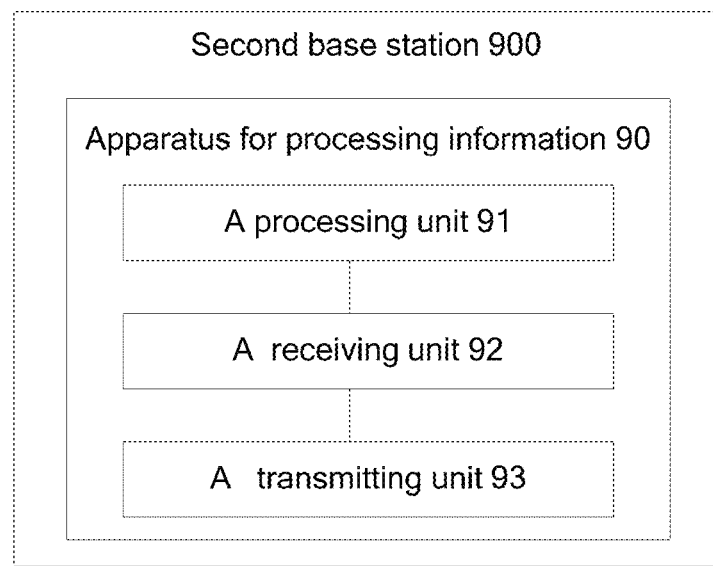
FIG. 22 is a schematic diagram illustrating a structure of an apparatus for processing information according to another embodiment of the present disclosure.

An embodiment of the present disclosure also provides an apparatus 90 for processing information, which is set in a second base station 900. FIG. 22 is a schematic diagram illustrating a structure of another apparatus for processing information according to an embodiment of the present disclosure. In the embodiment shown in FIG. 22, the first base station is a new base station, and a second base station is an old base station. The apparatus may include a processing unit 91, a receiving unit 92 and a transmitting unit 93.

The processing unit 91 is configured to initiate a procedure for a User Equipment (UE) for suspending user context information, and configure a timestamp for locally stored user context information or user history information.

The receiving unit 92 is configured to receive request message from a first base station for retrieving the user context information.

The transmitting unit 93 is configured to after the second base station locally locates the user context information of the UE according to the request message for retrieving the user context information, transmit the user context information that is located locally to a target base station through a response message for retrieving the user context information. In some embodiments, the user context information includes the user history information and the timestamp.

The embodiment of the present disclosure is used to implement the corresponding method embodiment. The procedure and principle of each unit in the embodiment of the present disclosure may refer to the description in the corresponding method embodiment, which is not described in detail herein.

In conclusion, by implementing technical schemes provided in the above-described embodiments of the present disclosure, the way of processing user history information in a resume procedure is optimized. The accuracy of the user history information used for the first base station to perform the subsequent optimization processing is enhanced, so that the accuracy of optimization processing is enhanced.

An embodiment of the present disclosure also provides a storage medium. Optionally, in the embodiment of the present disclosure, the storage medium may be configured as: storing program codes for executing the method corresponding to any one of above-described embodiments.

Optionally, in the embodiment of the present disclosure, the storage medium may include but is not limited to: various mediums to store program codes, such as U disk, Read-Only Memory (ROM), Random Access Memory (RAM), mobile hard disk, diskette or optical disk, etc.

Optionally, in the embodiment of the present disclosure, a processor executes the method corresponding to any one of above-described embodiments according to program codes stored in the storage medium.

Optionally, examples in some embodiments of the present disclosure may refer to the method corresponding to any one of above-described embodiments and examples described in any one of optional embodiments, which is not described in detail herein.

The above-described apparatus embodiments are only schematic. For example, partition of units is only one partition of logic functions. In practical implementation, there may be some other ways of partition. For another point, connections among presented or discussed units may be through some interfaces in an electrical, mechanic or other ways. Each unit may or may not be separated physically, may or may not be physical units. It may select part or all of units according to practical needs to implement technical schemes of embodiments of the present disclosure.

Besides, each functional unit in examples of the present disclosure may be integrated into a processing module, or may exist separately, or at least two functional units may be integrated into a module. The foregoing integrated module may be implemented with hardware, or with software functional module.

The above-described integrated modules implemented by a way of software functional units may be stored in a computer-readable storage medium. The above-described software functional modules are stored in a storage medium, including some instructions to enable a computer device (which may be a personal computer, a server or a network device, etc.) to execute part of steps in the method described in each embodiment of the present discourse. The above-described storage medium may include various mediums to store program codes, such as U disk, Read-Only Memory (ROM), Random Access Memory (RAM), mobile hard disk, diskette or optical disk, etc.

All described above are only examples and optional embodiments of the present disclosure, but protection scope of the present disclosure is not limited to it. Any technical person who is familiar with the technical field may easily figure out variations or substitutions, which should be included in the protection scope of the present disclosure. Hence, the protection scope of the present disclosure should be based on the protection scope of claims.

Ordinary technical persons in the field may understand that all or part of steps in the above-described embodiments may be implemented by using a computer program procedure. The computer program may be stored in a computer-readable storage medium. The computer program is executed in corresponding hardware platforms (according to system, device, apparatus, component, etc.). When being executed, one or combination of steps in the method embodiments may be included.

Optionally, part or all steps of the above-described embodiments may also be implemented by integrated circuits. Those steps may be made as some integrated circuit modules separately, or, some modules or steps may be made as a single integrated circuit.

Apparatus/functional modules/function units in the above-described embodiments may be implemented by using a general computing apparatus. They may be integrated in a single computing apparatus, or may be distributed in a network composed by multiple computing apparatuses.

Apparatus/functional modules/function units in the above-described embodiments may be implemented by software function modules, and when it is sold or used as an independent product, it may be stored in a computer-readable storage medium. The above-described computer-readable storage medium may be a read-only memory, magnetic disk or optical disk, etc.

INDUSTRY APPLICABILITY

According to technical schemes provided by embodiments of the present disclosure, the way of processing user history information in a resume procedure is optimized. The accuracy of the user history information used for the first base station (i.e., a new base station) to perform the subsequent optimization processing is enhanced, so that the accuracy of the optimization processing is enhanced.

What is claimed is:

1. A method for wireless communication, comprising:
acquiring, by a first base station, user context information of a User Equipment (UE) from a second base station by initiating a user context information acquiring procedure to the second base station, wherein the user context information includes user history information and a timestamp, and wherein the timestamp is configured by the second base station with respect to locally stored user context information or user history information after a suspend procedure is finished;
initiating, by the first base station, a path request procedure with a core-network device to update bearer path information and resume user context based on the user context information of the UE; and
determining, by the first base station according to the timestamp, whether the user history information is used after the UE resumes a connected state.

2. The method of claim 1, wherein the user history information includes one or more of: history information of the UE in a connected state, history information of the UE in a suspended state or history information recorded by the UE; and
wherein the history information includes one or more of: information of cells which the UE has resided in the past, the information comprising at least one of a cell global identifier, a cell type, or a duration for which the UE has resided in a cell, wherein the US is in a suspend state, a connection state, or an idle state.

3. The method of claim 1, wherein the core-network device includes a Mobility Management Entity (MME), or a Serving Gateway Node that supports Narrow Band Internet of Things (NB-IoT) users (C-SGN).

4. A method for wireless communication, comprising:
configuring, by a core-network device, a timer with respect to user history information upon receiving a user context suspend request message from a first base station, wherein the user context suspend request message includes the user history information;
receiving, by the core-network device, a path request message from a second base station; and
transmitting, by the core-network device, a path response message to the second base station, wherein the path response message optionally includes the user history information.

5. The method of claim 4, wherein the path response message includes the user history information in case the timer does not expire.

6. The method of claim 4, wherein the path response message omits the user history information in case the timer expires.

7. The method of claim 4, wherein the path response message includes the user history information and a timestamp determined in part based on the timer.

8. The method of claim 4, wherein the first base station is same as the second base station.

9. A method for wireless communication, comprising:
initiating, by a second base station, a user context information suspend procedure for a User Equipment (UE);
configuring, by the second base station, a timestamp with respect to locally stored user context information;
receiving, by the second base station, a user context acquiring request message from a first base station;
determining, by the second base station, user context information based on the user context acquiring request message and the locally stored user context information, wherein the user context information includes the user history information and the timestamp; and
transmitting, by the second base station, the user context information to the first base station through a user context acquiring response message.

10. The method of claim 9, wherein the user history information includes one or more of: history information of the UE in a connected state, history information of the UE in a suspended state or history information recorded by the UE; and
wherein the history information includes one or more of: information of cells which the UE has resided in the past, the information comprising at least one of a cell global identifier, a cell type, or a duration for which the UE has resided in a cell, wherein the US is in a suspend state, a connection state, or an idle state.

11. An apparatus for wireless communication, comprising a processor configured to:
acquire user context information of a User Equipment (UE) from a second base station by initiating a user context information acquiring procedure to the second base station, wherein the user context information includes user history information and a timestamp, and wherein the timestamp is configured by the second base station with respect to locally stored user context information or user history information after a suspend procedure is finished;
initiate a path request procedure with a core-network device to update bearer path information and resume user context based on the user context information of the UE; and
determine, according to the timestamp, whether the user history information is used after the UE resumes a connected state.

12. The apparatus of claim 11, wherein the user history information includes one or more of: history information of the UE in a connected state, history information of the UE in a suspended state or history information recorded by the UE; and wherein the history information includes one or more of: information of cells which the UE has resided in the past, the information comprising at least one of a cell global identifier, a cell type, or a duration for which the UE has resided in a cell, wherein the US is in a suspend state, a connection state, or an idle state.

13. The apparatus of claim 11, wherein the core-network device includes a Mobility Management Entity (MME), or a Serving Gateway Node that supports Narrow Band Internet of Things (NB-IoT) users (C-SGN).

14. An apparatus for wireless communication, comprising a processor configured to:
configure, upon receiving a user context suspend request message from a first base station, a timer with respect to user history information, wherein the user context suspend request message includes the user history information;
receive a path request message from a second base station; and
transmit a path response message to the second base station, wherein the path response message optionally includes the user history information.

15. The apparatus of claim 14, wherein the path response message includes the user history information in case the timer does not expire.

16. The apparatus of claim 14, wherein the path response message omits the user history information in case the timer expires.

17. The apparatus of claim 14, wherein the path response message includes the user history information and a timestamp determined in part based on the timer.

18. The apparatus of claim 14, wherein the first base station is same as the second base station.

19. An apparatus for wireless communication, comprising a processor configured to:
initiate a user context information suspend procedure for a User Equipment (UE);
configure a timestamp with respect to locally stored user context information n;
receive a user context acquiring request message from a first base station;
determine user context information based on the user context acquiring request message and the locally stored user context information, wherein the user context information includes the user history information and the timestamp; and
transmit the user context information to the first base station through a user context acquiring response message.

20. The apparatus of claim 19, wherein the user history information includes one or more of: history information of the UE in a connected state, history information of the UE in a suspended state or history information recorded by the UE; and
wherein the history information includes one or more of: information of cells which the UE has resided in the past, the information comprising at least one of a cell global identifier, a cell type, or a duration for which the UE has resided in a cell, wherein the US is in a suspend state, a connection state, or an idle state.

* * * * *